(12) United States Patent
Shock et al.

(10) Patent No.: US 8,991,215 B2
(45) Date of Patent: Mar. 31, 2015

(54) METHODS AND SYSTEMS FOR CONTROLLING BUBBLE SIZE AND BUBBLE DECAY RATE IN FOAMED GLASS PRODUCED BY A SUBMERGED COMBUSTION MELTER

(71) Applicant: Johns Manville, Denver, CO (US)

(72) Inventors: Jeffrey M Shock, Castle Rock, CO (US); Mark William Charbonneau, Lakewood, CO (US)

(73) Assignee: Johns Manville, Denver, CO (US)

( * ) Notice: Subject to any disclaimer, the term of this patent is extended or adjusted under 35 U.S.C. 154(b) by 188 days.

(21) Appl. No.: 13/644,039

(22) Filed: Oct. 3, 2012

(65) Prior Publication Data

US 2014/0090421 A1    Apr. 3, 2014

(51) Int. Cl.
| | |
|---|---|
| *C03B 5/225* | (2006.01) |
| *C03B 5/193* | (2006.01) |
| *C03B 5/20* | (2006.01) |
| *C03B 5/235* | (2006.01) |

(52) U.S. Cl.
CPC .............. *C03B 5/193* (2013.01); *C03B 5/202* (2013.01); *C03B 5/225* (2013.01); *C03B 5/235* (2013.01); *C03B 5/2353* (2013.01); *C03B 5/2356* (2013.01)
USPC ........... 65/134.4; 65/135.1; 65/134.9; 65/157

(58) Field of Classification Search
None
See application file for complete search history.

(56) References Cited

U.S. PATENT DOCUMENTS

| | | | |
|---|---|---|---|
| 1,716,433 | A | 6/1929 | McKelvey et al. |
| 1,989,103 | A | 1/1935 | McKelvey et al. |
| 2,174,533 | A | 10/1939 | See et al. |
| 2,118,479 | A | 1/1940 | McCaskey |
| 2,269,459 | A | 1/1942 | Kleist |
| 2,432,942 | A | 12/1947 | See et al. |
| 2,455,907 | A | 1/1948 | Slayter |
| 2,679,749 | A | 6/1954 | Poole |

(Continued)

FOREIGN PATENT DOCUMENTS

| | | |
|---|---|---|
| DE | 44 24 814 A1 | 1/1996 |
| DE | 100 29 963 C2 | 9/2003 |

(Continued)

OTHER PUBLICATIONS

"Glass Technologies—The Legacy of a Successful Public-Private Partnership", 2007, U.S. Department of Energy, pp. 1-32.

(Continued)

*Primary Examiner* — Lisa Herring
(74) *Attorney, Agent, or Firm* — Robert D. Touslee

(57) ABSTRACT

Methods and systems for controlling bubble size and bubble decay rate of glass foams formed during submerged combustion melting. Flowing a molten mass of foamed glass comprising molten glass and bubbles entrained therein into an apparatus downstream of a submerged combustion melter. The downstream apparatus has a floor, a roof, and a sidewall structure connecting the floor and roof. The foamed glass has glass foam of glass foam bubbles on its top surface, and the downstream apparatus defines a space for a gaseous atmosphere above and in contact with the glass foam. The downstream apparatus includes heating components to heat or maintain temperature of the foamed glass. Adjusting composition of the atmosphere above the glass foam, and/or contacting the foam with a liquid or solid composition controls bubble size of the glass foam bubbles, and/or foam decay rate.

4 Claims, 14 Drawing Sheets

(56) References Cited

U.S. PATENT DOCUMENTS

| | | |
|---|---|---|
| 2,718,096 A | 9/1955 | Henry et al. |
| 2,773,545 A | 12/1956 | Petersen |
| 2,781,756 A | 2/1957 | Kobe |
| 2,878,844 A | 3/1959 | Fenn |
| 2,890,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumet |
| 3,237,929 A | 3/1966 | Plumat et al. |
| 3,241,548 A | 3/1966 | See et al. |
| 3,245,769 A | 4/1966 | Eck et al. |
| 3,248,205 A | 4/1966 | Dolf et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,375,095 A * | 3/1968 | Poole .......................... 65/134.5 |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,421,873 A | 1/1969 | Burgman et al. |
| 3,432,399 A | 3/1969 | Schutt |
| 3,445,214 A | 5/1969 | Orernesher |
| 3,498,779 A | 3/1970 | Hathaway |
| 3,510,393 A | 5/1970 | Burgman et al. |
| 3,519,412 A | 7/1970 | Olink |
| 3,525,674 A | 8/1970 | Barnebey |
| 3,533,770 A | 10/1970 | Adler et al. |
| 3,563,683 A | 2/1971 | Hess |
| 3,592,151 A | 7/1971 | Webber |
| 3,592,623 A | 7/1971 | Shepherd |
| 3,606,825 A | 9/1971 | Johnson |
| 3,617,234 A | 11/1971 | Hawkins et al. |
| 3,627,504 A | 12/1971 | Johnson et al. |
| 3,692,017 A | 9/1972 | Glachant et al. |
| 3,717,139 A | 2/1973 | Guillet et al. |
| 3,738,792 A | 6/1973 | Feng |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,585 A | 9/1975 | Francel et al. |
| 3,913,560 A | 10/1975 | Lazarre et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,083,711 A | 4/1978 | Jensen |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,226,564 A | 10/1980 | Takahashi et al. |
| 4,238,226 A | 12/1980 | Sanzenbacher et al. |
| 4,249,927 A | 2/1981 | Fukuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,406,683 A | 9/1983 | Demarest |
| 4,413,882 A | 11/1983 | Bailey et al. |
| 4,424,071 A | 1/1984 | Steitz et al. |
| 4,432,780 A | 2/1984 | Propster et al. |
| 4,488,537 A | 12/1984 | Laurent |
| 4,539,034 A | 9/1985 | Hanneken |
| 4,542,106 A | 9/1985 | Sproull |
| 4,545,800 A | 10/1985 | Won et al. |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,794,860 A * | 1/1989 | Welton .......................... 65/134.2 |
| 4,798,616 A | 1/1989 | Knavish et al. |
| 4,814,387 A | 3/1989 | Donat |
| 4,816,056 A | 3/1989 | Tsai et al. |
| 4,877,436 A | 10/1989 | Sheinkop |
| 4,882,736 A | 11/1989 | Pieper |
| 4,886,539 A | 12/1989 | Gerutti et al. |
| 4,919,700 A | 4/1990 | Pecoraro et al. |
| 4,927,886 A | 5/1990 | Backderf et al. |
| 4,953,376 A | 9/1990 | Merlone |
| 5,011,086 A | 4/1991 | Sonnleitner |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,586,999 A * | 12/1996 | Kobayashi .......................... 65/134.3 |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |

(56) References Cited

U.S. PATENT DOCUMENTS

| | | |
|---|---|---|
| 6,029,910 A | 2/2000 | Joshi et al. |
| 6,036,480 A | 3/2000 | Hughes et al. |
| 6,039,787 A | 3/2000 | Edlinger |
| 6,045,353 A | 4/2000 | VonDrasek et al. |
| 6,068,468 A | 5/2000 | Phillipe et al. |
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novich |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,332,339 B1 | 12/2001 | Kawaguchi et al. |
| 6,338,337 B1 | 1/2002 | Panz et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,536,238 B2 | 3/2003 | Kawaguchi et al. |
| 6,536,651 B2 | 3/2003 | Ezumi et al. |
| 6,558,606 B1 | 5/2003 | Kulkarni et al. |
| 6,578,779 B2 | 6/2003 | Dion |
| 6,660,106 B1 | 12/2003 | Babel et al. |
| 6,694,791 B1 | 2/2004 | Johnson et al. |
| 6,701,617 B2 | 3/2004 | Li et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kulkarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 8,033,254 B2 | 10/2011 | Hannum et al. |
| 8,279,899 B2 | 10/2012 | Kitabayashi |
| 8,285,411 B2 | 10/2012 | Hull et al. |
| 2002/0086077 A1 | 7/2002 | Noller et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0015000 A1 | 1/2003 | Hayes et al. |
| 2003/0029197 A1 | 2/2003 | Jeanvoine et al. |
| 2003/0037571 A1* | 2/2003 | Kobayashi et al. .......... 65/134.4 |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0103323 A1 | 5/2005 | Engdal |
| 2005/0236747 A1 | 10/2005 | Rue et al. |
| 2006/0000239 A1 | 1/2006 | Jeanvoine et al. |
| 2006/0174655 A1 | 8/2006 | Kobayashi et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0212546 A1 | 9/2007 | Jeanvoine et al. |
| 2007/0220922 A1 | 9/2007 | Bauer et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0293857 A1 | 11/2008 | Crawford et al. |
| 2009/0042709 A1 | 2/2009 | Jeanvoine et al. |
| 2009/0220899 A1 | 9/2009 | Spangelo et al. |
| 2010/0064732 A1* | 3/2010 | Jeanvoine et al. .............. 65/482 |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0143601 A1 | 6/2010 | Hawtof et al. |
| 2010/0227971 A1 | 9/2010 | Crawford et al. |
| 2010/0236323 A1 | 9/2010 | D'Angelico et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0326137 A1 | 12/2010 | Rouchy et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0077135 A1 | 3/2012 | Charbonneau |
| 2013/0072371 A1* | 3/2013 | Jansen et al. .................... 501/11 |
| 2013/0086944 A1 | 4/2013 | Shock et al. |
| 2013/0086949 A1 | 4/2013 | Charbonneau |
| 2013/0086950 A1 | 4/2013 | Huber et al. |

(56) References Cited

U.S. PATENT DOCUMENTS

| | | | |
|---|---|---|---|
| 2013/0086951 A1 | 4/2013 | Charbonneau et al. | |
| 2013/0086952 A1 | 4/2013 | Charbonneau et al. | |

FOREIGN PATENT DOCUMENTS

| | | | |
|---|---|---|---|
| DE | 10 2005 033330 B3 | 8/2006 | |
| EP | 0 181 248 B1 | 10/1989 | |
| EP | 1 337 789 B1 | 12/2004 | |
| EP | 2 133 315 A1 | 12/2009 | |
| EP | 1 986 966 B1 | 4/2010 | |
| EP | 1 667 934 B1 | 2/2011 | |
| EP | 2 397 446 A2 | 12/2011 | |
| EP | 2 433 911 A1 | 3/2012 | |
| EP | 2 578 548 A2 | 4/2013 | |
| FR | 2 740 860 A1 | 9/1997 | |
| GB | 191301772 | 0/1914 | |
| GB | 191407633 | 0/1914 | |
| GB | 164073 A | 5/1921 | |
| GB | 1449439 | 9/1976 | |
| IT | 1208172 | 7/1989 | |
| KR | 2000 0050572 A | 5/2000 | |
| RO | 114827 | 7/1999 | |
| WO | 9855411 A1 | 12/1998 | |
| WO | 2008103291 A1 | 8/2008 | |
| WO | 2009091558 A1 | 7/2009 | |
| WO | 2010011701 A2 | 1/2010 | |
| WO | 2010045196 A3 | 4/2010 | |

OTHER PUBLICATIONS

Rue, "Energy-Efficient Glass Melting—The Next Generation Melter", Gas Technology Institue, Project No. 20621 Final Report, 2008.
U.S. Appl. No. 12/817,754, filed Jun. 17, 2010, Huber.
U.S. Appl. No. 12/888,970, filed Sep. 23, 2010, Charbonneau.
U.S. Appl. No. 13/267,990, filed Oct. 7, 2010, Shock et al.
U.S. Appl. No. 13/268,028, filed Oct. 7, 2010, Charbonneau.
U.S. Appl. No. 13/268,065, filed Oct. 7, 2010, Charbonneau et al.
U.S. Appl. No. 13/268,098, filed Oct. 7, 2010, Huber et al.
U.S. Appl. No. 13/268,130, filed Oct. 7, 2010, Charbonneau et al.
U.S. Appl. No. 13/458,211, filed Apr. 27, 2012, Mobley et al.
U.S. Appl. No. 13/493,170, filed Jun. 11, 2012, Huber et al.
U.S. Appl. No. 13/493,219, filed Jun. 11, 2012, Charbonneau.
"Glass Industry of the Future", Sep. 30, 2008, United States Department of Energy, report 02-GA50113-03, pp. 1-17.
Stevenson, "Foam Engineering: Fundamentals and Applications", Published 2012, Chapter 16, John Wiley & Sons, Ltd.
Clare et al., "Density and Surface Tension of Borate Containing Silicate Glass Melts", Glass Technology, 2003, 44 (2), pp. 59-62.
Seward, T.P., "Modeling of Glass Making Processes for Improved Efficiency", DE-FG07-96EE41262, Final Report, Mar. 31, 2003.
Conradt et al, Foaming behaviour on glass melts, Glastechniche Berichte 60 (1987) Nr. 6, S. 189-201 Abstract Fraunhofer ISC.
Kim et al., "Foaming in Glass Melts Produced by Sodium Sulfate Decomposition under Isothermal Conditions", Journal of the American Ceramic Society, 1991, 74(3), pp. 551-555.
Kim et al., "Foaming in Glass Melts Produced by Sodium Sulfate Decomposition under Ramp Heating Conditions", Journal of the American Ceramic Society, 1992, 75(11), pp. 2959-2963.
Kim et al., "Effect of Furnace Atmosphere on E-glass Foaming", Journal of Non-Crystalline Solids, 2006, 352(50/51), pp. 5287-5295.
Van Limpt, et al., "Modelling the evaporation of boron species, Alkali-free borosilicate glass melts", Glass Technology—European Journal of Glass Science and Technology, Part 1, Jun. 2011, 52(3), pp. 77-87.
U.S. Appl. No. 13/540,771, filed Jul. 3, 2012, Charbonneau et al.
U.S. Appl. No. 13/633,998, filed Oct. 3, 2012, Charbonneau et al.
U.S. Appl. No. 13/633,979, filed Oct. 3, 2012, Charbonneau et al.
U.S. Appl. No. 13/644,058, filed Oct. 3, 2012, Charbonneau et al.
U.S. Appl. No. 13/644,104, filed Oct. 3, 2012, Charbonneau et al.
Kappel, et al., "Foaming behaviour on glass melts", Fraunhofer-Institut fur Silcatforschung, Wurzburg (FRG).
"AccuTru Temperature Measurement," AccuTru International Corporation, 2003.
"Glass Melting Technology—A Technical and Economic Assessment," 2004, U.S. Department of Energy, pp. 1-292.
"Canty Process Technology" brochure, date unknown, received in Apr. 2012 at American Institute of Chemical Engineers, Spring Meeting, Houston, TX.
Olabin, V.M. et al., "Submerged Combustion Furnace for Glass Melts," Ceramic Engineering and Science Proceedings, Jan. 1, 1996, pp. 84-92, vol. 17—No. 2, American Ceramic Society Inc., US.
Higley, BA, Glass Melter System Technologies for Vitrification of High-Sodium Content Low-Level, Radioactive, Liquid Wastes—Phase I: SBS Demonstration With Simulated Low-Level Waste—Final Test Report, Westinghouse Hanford Company.
Report for Treating Hanford LAW and WTP SW Simulants: Pilot Plant Mineralizing Flowsheet Apr. 2009, Department of Energy Environmental Management Consolidated Business Center by THOR Treatment Technologies, LLC.

\* cited by examiner

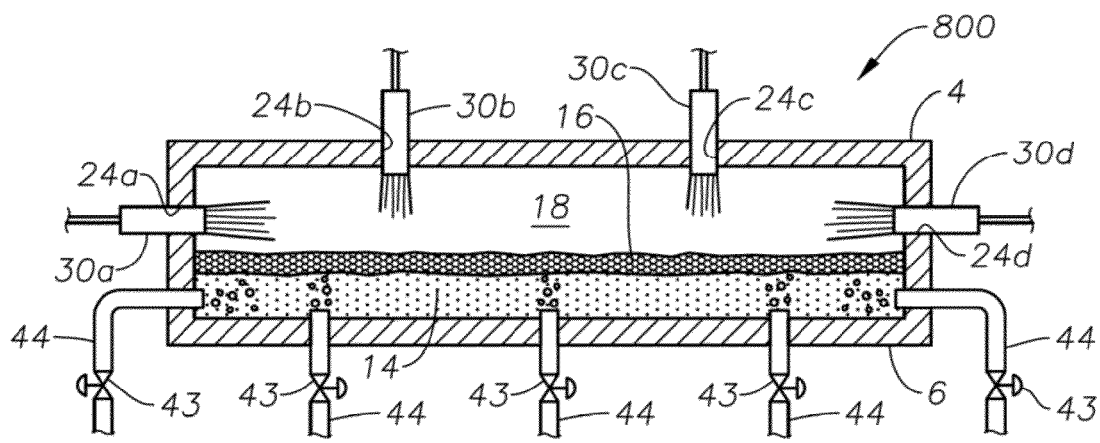

FIG. 10

Flowing a molten mass of foamed glass comprising molten glass and bubbles entrained therein into an apparatus downstream of a submerged combustion melter, the downstream apparatus comprising a floor, a roof, and a sidewall structure connecting the floor and roof, the foamed glass having glass foam comprising glass foam bubbles on at least a portion of a top surface of the foamed glass, the downstream apparatus defining a space for a gaseous atmosphere above and in contact with the glass foam. — 902

Heating or maintaining temperature of the foamed glass in the downstream apparatus. — 904

Controlling bubble size of the glass foam bubbles in the foamed glass by controlling composition of the atmosphere above the glass foam in the downstream apparatus. — 906

FIG. 11

METHODS AND SYSTEMS FOR CONTROLLING BUBBLE SIZE AND BUBBLE DECAY RATE IN FOAMED GLASS PRODUCED BY A SUBMERGED COMBUSTION MELTER

CROSS-REFERENCE TO RELATED APPLICATIONS

This application may be related to the following United States non-provisional patent applications assigned to the assignee of the present application which are all incorporated by reference herein: Ser. No. 12/817,754, filed Jun. 17, 2010, now U.S. Pat. No. 8,769,992; Ser. Nos. 13/267,990, 13/268,028, now U.S. Pat. No. 8,875,544, Ser. No. 13/268,098, now U.S. Pat. No. 8,707,740, and Ser. No. 13/268,130, all four filed Oct. 7, 2011; Ser. No. 13/458,211, filed Apr. 27, 2012; Ser. No. 13/493,170, now U.S. Pat. No. 8,707,739 and Ser. No. 13/493,219, both filed Jun. 11, 2012; Ser. No. 13/540,771, filed Jul. 3, 2012; and Ser. Nos. 13/644,058, 13/644,104, 13/633,979, and 13/633,998, all filed Oct. 3, 2012.

BACKGROUND INFORMATION

1. Technical Field

The present disclosure relates generally to the field of combustion furnaces and methods of use to produce glass, and more specifically to methods and systems to control bubble size and/or foam decay rate in glass handling equipment downstream of a submerged combustion melter.

2. Background Art

A submerged combustion melter (SCM) may be employed to melt glass batch materials to produce molten glass by passing oxygen, oxygen-enriched mixtures, or air along with a liquid or gaseous fuel, or particulate fuel in the glass batch, directly into a molten pool of glass usually through burners submerged in a glass melt pool. The introduction of high flow rates of products of combustion of the oxidant and fuel into the molten glass, and the expansion of the gases cause rapid melting of the glass batch and much turbulence, and possibly foaming.

While traditional, non-submerged combustion melters may to a lesser degree suffer from the problems discussed herein (and therefore may benefit from one or more aspects of this disclosure), molten glass produced by an SCM is typically about 30 percent void fraction or more with small bubbles that may have a range of sizes distributed throughout the molten mass of glass. These are referred to herein as "entrained bubbles." This void fraction is much higher than molten glass produced by traditional, non-submerged combustion melters. For good glass fiber production from an SCM or other melter, it is preferred that the bubbles be allowed to coalesce and rise to the surface giving good, clean, well-defined molten glass in lower regions of downstream channels and forehearths to be delivered to a forming operation, such as for continuous e-glass fibers. With regard to SCMs, attempts to reduce the foam through SCM process adjustments, such as use of helium and steam to scavenge and consolidate bubbles, sonic methods to consolidate bubbles, vacuum to increase bubble size, and centrifugal force have not met with complete success in reducing foam from an SCM to an acceptable amount. Certain SCMs and/or flow channels may employ one or more high momentum burners, for example, to impinge on portions of a foam layer. High momentum burners are disclosed assignee's U.S. patent application Ser. No. 13/268,130, filed Oct. 7, 2011. Various methods and systems for de-stabilizing the foam layer in equipment downstream of an SCM are proposed in assignee's U.S. patent application Ser. Nos. 13/644,058 and 13/644,104, both filed Oct. 3, 2012. On the other hand, for production of foam glass products from an SCM, it may be preferred to maintain the bubbles in their entrained state.

It would be an advance in the glass manufacturing art if foams produced during melting of glass-forming materials, and in particular foams produced during submerged combustion melting of glass-forming materials, could be controlled in equipment downstream of the SCM.

SUMMARY

In accordance with the present disclosure, methods and systems are described that allow foams produced during submerged combustion melting of glass-forming materials to be controlled in equipment downstream of the SCM. While the methods and systems of the present disclosure may also be applicable to non-submerged combustion melters, the highly turbulent molten foamed glass formed in SCMs is a particular target of the methods and systems of the present disclosure.

A first aspect of the disclosure is a method comprising:
flowing a molten mass of foamed glass comprising molten glass and bubbles entrained therein into an apparatus downstream of a submerged combustion melter, the downstream apparatus comprising a floor, a roof, and a sidewall structure connecting the floor and roof, the foamed glass having glass foam comprising glass foam bubbles on at least a portion of a top surface of the foamed glass, the downstream apparatus defining a space for a gaseous atmosphere above and in contact with the glass foam;
heating or maintaining temperature of the foamed glass in the downstream apparatus; and
controlling bubble size of the glass foam bubbles in the foamed glass by controlling composition of the atmosphere above the glass foam in the downstream apparatus.

A second aspect of the disclosure is a method comprising:
flowing a molten mass of foamed glass comprising molten glass and bubbles entrained therein into an apparatus downstream of a submerged combustion melter, the downstream apparatus comprising a floor, a roof, and a sidewall structure connecting the floor and the roof, the foamed glass having glass foam comprising glass foam bubbles on at least a portion of a top surface of the foamed glass, the downstream apparatus defining a space for a gaseous atmosphere above and in contact with the glass foam;
heating or maintaining temperature of the foamed glass using only combustion heating comprising one or more non-submerged oxy-fuel combustion burners positioned in the sidewall structure and/or the roof of the downstream apparatus, the non-submerged oxy-fuel combustion burners contributing to production of the atmosphere above the glass foam; and
controlling bubble size of the glass foam bubbles by bubbling a composition comprising an oxygenated sulfur compound and optionally oxygen below a level of the foamed glass in the downstream apparatus, thereby stabilizing size of the glass foam bubbles and a foam decay rate, with the proviso that if oxygen is present in the composition, the molar ratio of oxygenated sulfur compound to oxygen ranges from about 3:1 to about 0.5:1.

A third aspect of the disclosure is a method comprising:
flowing a molten mass of foamed glass comprising molten glass and bubbles entrained therein into an apparatus downstream of a submerged combustion melter, the downstream apparatus comprising a floor, a roof, and a sidewall structure connecting the floor and the roof, the foamed glass having glass foam comprising glass foam bubbles on at least a portion of a top surface of the foamed glass, the downstream apparatus defining a space for a gaseous atmosphere above and in contact with the glass foam;

heating or maintaining temperature of the foamed glass in the downstream apparatus; and controlling a foam decay rate of the glass foam bubbles by:
i) adjusting composition of at least a portion of the gaseous atmosphere; or
ii) contacting a top surface of the glass foam with a liquid or solid composition or combination thereof; or
iii) combination of (i) and (ii).

A fourth aspect of the disclosure is a method comprising:

flowing a molten mass of foamed glass comprising molten glass and bubbles entrained therein into an apparatus downstream of a submerged combustion melter, the downstream apparatus comprising a floor, a roof, and a sidewall structure connecting the floor and roof, the foamed glass having glass foam comprising glass foam bubbles on at least a portion of a top surface of the foamed glass, the downstream apparatus defining a space for a gaseous atmosphere above and in contact with the glass foam;

heating or maintaining temperature of the foamed glass in the downstream apparatus using only combustion heating comprising one or more non-submerged oxy-fuel combustion burners positioned in corresponding apertures in the sidewall structure and/or the roof of the downstream apparatus, the non-submerged oxy-fuel combustion burners producing combustion products contributing to formation of the atmosphere above the glass foam; and increasing foam decay rate of the glass foam bubbles by dropping a mixture of alkali metal chalcogen particles and glass particles through the gaseous atmosphere and onto at least a portion of the glass foam from one or more sources outside of and fluidly connected to the downstream apparatus, the glass particles having same or similar composition as the foamed glass.

A fifth aspect of the disclosure is a method comprising:

flowing a molten mass of foamed glass comprising molten glass and bubbles entrained therein into an apparatus downstream of a submerged combustion melter, the downstream apparatus comprising a floor, a roof, and a sidewall structure connecting the floor and roof, the foamed glass having glass foam comprising glass foam bubbles on at least a portion of a top surface of the foamed glass, the downstream apparatus defining a space for a gaseous atmosphere above and in contact with the glass foam;

heating or maintaining temperature of the foamed glass in the downstream apparatus using only combustion heating comprising one or more non-submerged oxy-fuel combustion burners positioned in corresponding apertures in the sidewall structure and/or the roof of the downstream apparatus, the non-submerged oxy-fuel combustion burners producing combustion products contributing to formation of the atmosphere above the glass foam; and increasing foam decay rate of the glass foam bubbles by fully saturating the gaseous atmosphere with water by injecting a water vapor spray and/or steam from a first source outside of and fluidly connected to the downstream apparatus, and dripping water through the gaseous atmosphere and onto at least a portion of the glass foam from a second source outside of and fluidly connected to the downstream apparatus.

Other aspects of the disclosure include systems for carrying out the above methods.

Methods and systems of this disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which:

FIG. 10 is a schematic transverse cross-section of the embodiment in FIG. 9;

FIGS. 11, 12, 13, 14, and 15 are logic diagrams of five method embodiments of the present disclosure.

Figure 1:
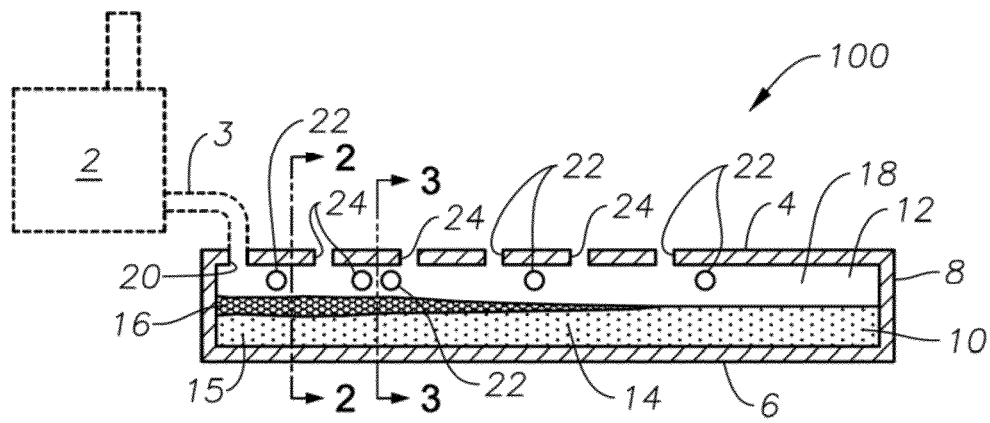
FIG. 1 is a schematic side elevation view, partially in cross-section, of one system embodiment in accordance with the present disclosure.

It is to be noted, however, that the appended drawings of FIGS. 1-10 may not be to scale and illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed systems and methods. However, it will be understood by those skilled in the art that the systems and methods covered by the claims may be practiced without these details and that numerous variations or modifications from the specifically described embodiments may be possible and are deemed within the claims. All U.S. published patent applications and U.S. patents referenced herein are hereby explicitly incorporated herein by reference. In the event definitions of terms in the referenced patents and applications conflict with how those terms are defined in the present application, the definitions for those terms that are provided in the present application shall be deemed controlling.

As explained briefly in the Background, molten glass produced by an SCM is typically about 30 percent void fraction or more with small bubbles distributed throughout the molten mass of glass, and this void fraction is much higher than molten glass produced by traditional, non-submerged combustion melters. Attempts to reduce the foam through SCM process adjustments, for example to produce good glass fibers from an SCM, have not met with complete success in reducing foam from an SCM to an acceptable amount. On the other hand, for production of foam glass products from an SCM, it may be preferred to maintain the bubbles in their entrained state.

The inventors herein have discovered that the size of bubbles collecting at the top surface of the molten glass from an SCM forming a foam layer, and the rate at which the bubbles burst upon reaching a clearly discernable glass surface, referred to herein as the "foam decay rate", may be controlled in apparatus downstream of the SCM. To produce glass products having low or no voids, and for good heat penetration from heat sources over the foam and into the molten glass, the foam decay rate is controlled in apparatus downstream of the SCM to be as fast as possible. On the other hand, for production of foam glass products from an SCM, the foam decay rate in apparatus downstream of the SCM is controlled to be slow and the size of the bubbles within the foam may be influenced or controlled. A slower foam decay rate insures production of a foam glass product, all other parameters being equal, and control of the bubble size within the foam may enable production of foam glass products of specific strength, insulating properties, and/or density.

Various terms are used throughout this disclosure. "Submerged" as used herein means that combustion gases emanate from a combustion burner exit that is under the level of the molten glass, and "non-submerged" means that combustion gases do not emanate from combustion burner exits under the level of molten glass, whether in the SCM or downstream apparatus. Both submerged and non-submerged burners may be roof-mounted, floor-mounted, wall-mounted, or any combination thereof (for example, two floor mounted burners and one wall mounted burner). "SC" as used herein means "submerged combustion" unless otherwise specifically noted, and "SCM" means submerged combustion melter unless otherwise specifically noted.

The term "composition" includes one or more gases, one or more liquids or solids that may evolve a gas or become gaseous under the high temperature conditions associated with submerged combustion melting, one or more particulate solids, and combinations of thereof, including slurries, mixtures of a gas and solid particles, and the like.

The terms "foam" and "foamy" include froths, spume, suds, heads, fluffs, fizzes, lathers, effervesces, layer and the like. The term "bubble" means a thin, shaped, gas-filled film of molten glass. The shape may be spherical, hemispherical, rectangular, polyhedral, ovoid, and the like. The gas or "bubble atmosphere" in the gas-filled SC bubbles may comprise oxygen or other oxidants, nitrogen, combustion products (including but not limited to, carbon dioxide, carbon monoxide, $NO_x$, $SO_x$, $H_2S$, and water), reaction products of glass-forming ingredients (for example, but not limited to, sand (primarily $SiO_2$), clay, limestone (primarily $CaCO_3$), burnt dolomitic lime, borax and boric acid, and the like. Bubbles may include solids particles, for example soot particles, either in the film, the gas inside the film, or both. The term "glass foam" means foam where the liquid film comprises molten glass. "Glass level" means the distance measured from the bottom of a downstream apparatus to the upper liquid level of the molten glass, and "foam level" means the distance measured from the top of the atmosphere above the foam layer to the upper surface of the foam layer. "Foam height" (equivalent to foam thickness) is the distance measured between the glass level and foam level.

As used herein the term "combustion" means deflagration-type combustion unless other types of combustion are specifically noted, such as detonation-type combustion. Deflagration is sub-sonic combustion that usually propagates through thermal conductivity; hot burning material heats the next layer of cold material and ignites it. Detonation is supersonic and primarily propagates through shock. As used herein the terms "combustion gases" and "combustion products" means substantially gaseous mixtures of combusted fuel, any excess oxidant, and combustion products, such as oxides of carbon (such as carbon monoxide, carbon dioxide), oxides of nitrogen, oxides of sulfur, and water, whether from deflagration, detonation, or combination thereof. Combustion products may include liquids and solids, for example soot and unburned or non-combusted fuels.

"Oxidant" as used herein includes air and gases having the same molar concentrations of oxygen and nitrogen as air (synthetic air), oxygen-enriched air (air having oxygen concentration greater than 21 mole percent), and "pure" oxygen, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids (for example coal powders, carbon black, soot, and the like), and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof.

The sources of oxidant and fuel may be one or more conduits, pipelines, storage facility, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

The term "downstream apparatus" means a container, channel or conduit defined at least by a floor and a wall structure extending upwards from the floor to form a space in which molten glass may be present, whether flowing or not. In certain embodiments the downstream apparatus will include a roof and a wall structure connecting the floor and roof. The downstream apparatus may have any operable cross-sectional shape (for example, but not limited to, rectangular, oval, circular, trapezoidal, hexagonal, and the like) and any flow path shape (for example, but not limited to, straight, zigzag, curved, and combinations thereof). In certain systems and methods the downstream apparatus may be a flow channel selected from the group consisting of a conditioning channel, a distribution channel, and a forehearth.

Downstream apparatus, as well as conduits used in burners and devices for delivery of compositions useful in systems and methods of the present disclosure may be comprised of metal, ceramic, ceramic-lined metal, or combination thereof. Suitable metals include stainless steels, for example, but not limited to, 306 and 316 steel, as well as titanium alloys, aluminum alloys, and the like. Suitable materials for the glass-contact refractory, which may be present in SC melters and flow channels, and refractory burner blocks (if used), include fused zirconia ($ZrO_2$), fused cast AZS (alumina-zirconia-silica), rebonded AZS, or fused cast alumina ($Al_2O_3$). The particular system and method, downstream apparatus, burner geometry, composition delivery system, and type of glass to be produced may all dictate the choice of a particular material, among other parameters.

Certain submerged and non-submerged combustion burners, certain components in and/or protruding through one or more of the floor, roof, and sidewall structure configured to heat or maintaining temperature of the foamed glass, certain apparatus for delivering a composition through one or more apertures in the sidewall structure and/or the roof for admitting one or more compositions into the atmosphere, and certain portions of the sources of the compositions fluidly connected to the apertures useful in systems and methods of this disclosure may be fluid-cooled, and may include first and second (or more) concentric conduits. In the case of burners, the first conduit may be fluidly connected at one end to a source of fuel, the second conduit may be fluidly connected to a source of oxidant, and a third substantially concentric conduit may connect to a source of cooling fluid.

Certain systems of this disclosure may comprise one or more non-submerged burners. Suitable non-submerged combustion burners may comprise a fuel inlet conduit having an exit nozzle, the conduit and nozzle inserted into a cavity of a ceramic burner block, the ceramic burner block in turn inserted into either the roof or the wall structure, or both the roof and wall structure of the downstream apparatus.

In certain systems, one or more burners may be adjustable with respect to direction of flow of the combustion products. Adjustment may be via automatic, semi-automatic, or manual control. Certain system embodiments may comprise a burner mount that mounts the burner in the wall structure, roof, or floor of the downstream apparatus comprising a refractory, or refractory-lined ball joint. Other burner mounts may comprise rails mounted in slots in the wall or roof. In yet other embodiments the burners may be mounted outside of the downstream apparatus, on supports that allow adjustment of the combustion products flow direction. Useable supports include those comprising ball joints, cradles, rails, and the like.

In certain systems and methods of the present disclosure, the downstream apparatus may comprise a flow channel comprising a series of sections, and may comprise one or more skimmers and/or impingement (high momentum) burners, such as described in assignee's U.S. application Ser. No. 13/268,130, filed Oct. 7, 2011, and Ser. No. 13/493,170, now U.S. Pat. No. 8,707,739, filed Jun. 11, 2012. Certain systems and methods of the present disclosure may utilize measurement and control schemes such as described in assignee's co-pending application Ser. No. 13/493,219, filed Jun. 11, 2012, and/or feed batch densification systems and methods as described in assignee's co-pending application Ser. No. 13/540,704, filed Jul. 3, 2012. Certain systems and methods of the present disclosure may utilize one or more retractable devices for delivery of treating compositions such as disclosed in assignee's co-pending application Ser. No. 13/633, 998, filed Oct. 3, 2012. Certain systems and methods of the present disclosure may utilize one or more nozzles for delivery of treating compositions such as disclosed in assignee's co-pending application Ser. No. 13/644,058, filed Oct. 3, 2012.

Certain systems and methods of this disclosure may be controlled by one or more controllers. For example, burner (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters the burner, temperature of the primary oxidant as it enters the burner, temperature of the effluent, pressure of the primary oxidant entering the burner, humidity of the oxidant, burner geometry, combustion ratio, and combinations thereof. Certain systems and methods of this disclosure may also measure and/or monitor feed rate of batch or other feed materials, such as glass batch, cullet, mat or wound roving and treatment compositions, mass of feed, and use these measurements for control purposes. Exemplary systems and methods of the disclosure may comprise a controller which receives one or more input parameters selected from temperature of melt, composition of bubbles and/or foam, height of foam layer, glass level, foam level, and combinations thereof, and may employ a control algorithm to control combustion temperature, flow rate and/or composition of compositions to control foam decay rate and/or glass foam bubble size, and other output parameters based on one or more of these input parameters.

Specific non-limiting system and method embodiments in accordance with the present disclosure will now be presented in conjunction with the attached drawing figures. The same numerals are used for the same or similar features in the various figures. In the views illustrated in the drawing figures, it will be understood in each case that the figures are schematic in nature, and certain conventional features may not be illustrated in all embodiments in order to illustrate more clearly the key features of each embodiment. The geometry of the downstream apparatus is illustrated generally the same in the various embodiments, but that of course is not necessary. Certain systems and methods may be described as comprising an SCM and one or more downstream apparatus receiving flow of molten glass and foam from the SCM.

Figure 2:
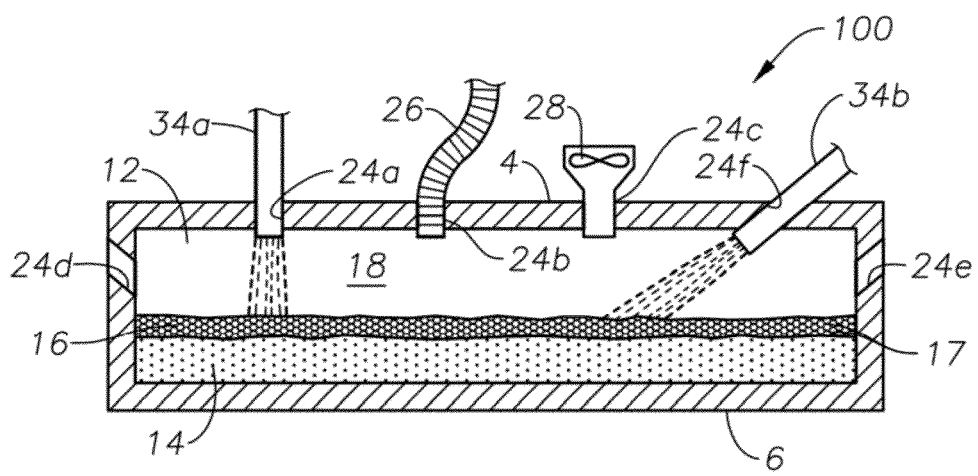
FIG. 2 is a schematic transverse cross-section of the embodiment in FIG. 1.
Figure 3:
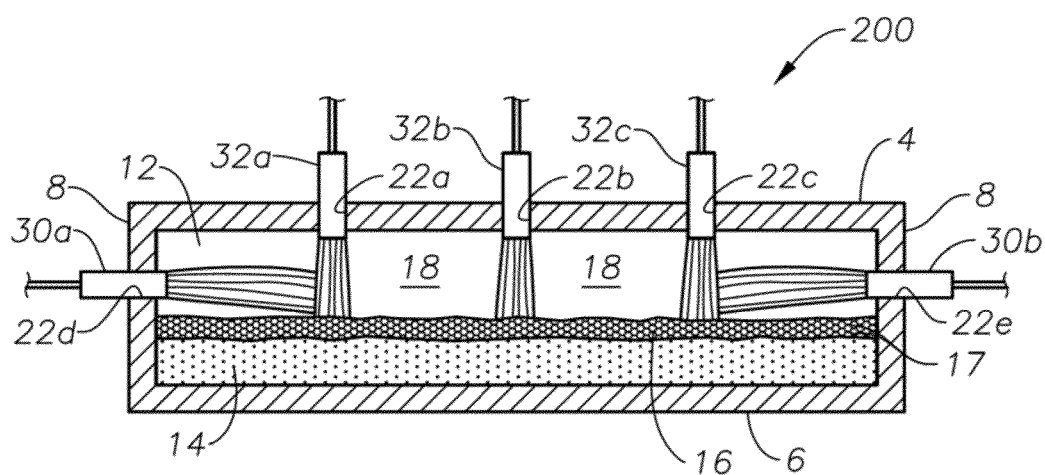
FIGS. 3, 4, 5, 6, 7 and 8 are schematic transverse cross-sectional views of six alternative embodiments of the system of FIGS. 1 and 2.

FIG. 1 is a schematic side elevation view, partially in cross-section, of one system embodiment 100 in accordance with the present disclosure, and FIG. 2 is a schematic transverse cross-section of embodiment 100. In all of the drawing figures where an SCM is illustrated, such as at 2 in FIG. 1, the SCM is illustrated in dashed lines, indicating that the SCM is not, strictly speaking, a part of every system and method of the present disclosure. However, certain systems and methods may be described as comprising an SCM and one or more downstream apparatus receiving flow of molten glass and foam from the SCM. Molten glass and foam produced in SCM 2 flow into a forehearth or other downstream apparatus via a melter exit structure 3, also illustrated in dashed lines, fluidly connecting SCM 2 and the downstream apparatus, the downstream apparatus having a roof 4, floor 6, and sidewall structure 8 connecting roof 4 with floor 6. An exit structure, 3, fluidly (and in certain embodiments mechanically) connects SCM 2 with the downstream apparatus. Floor 6 and a portion of sidewall structure 8 define a first space 10 for containing a flowing or non-flowing molten mass of glass 14. A second space 12 is defined by roof 4 and another portion of sidewall structure 8, and confines an atmosphere 18 above and in contact with a glass foam layer 16 floating on top of molten glass 14. Molten glass 14 includes a plurality of entrained bubbles 15, and glass foam layer 16 includes a plurality of glass foam bubbles 17. The downstream apparatus includes at least one inlet aperture 20 for receiving molten mass of glass 14 and foam 16. One or more other apertures 22 in roof 4 and/or sidewall structure 8 may be provided for heat sources, which may be either combustion burners, electrical heating elements, or some combination thereof. One or more other apertures 24 in roof 4 and/or sidewall structure 8 may be provided for introducing one or more compositions into the downstream apparatus, as will now be discussed in more detail. The schematic transverse cross-section of embodiment 100 of FIG. 2 illustrates how various levels of moisture may be maintained in atmosphere 18. Apertures 24a, 24f allow positioning of water sprayers or steam lances 34a, 34b, respectively; aperture 24b allows connection of a source 26 of dry ambient air or dry synthetic air; aperture 24c allows connection of a source of ambient air through use of a fan 28. Finally, optional apertures 24d, 24e may be provided for introduction of other moisture-laden compositions or dry compositions. Manipulation of the sources allows manipulation of the moisture content or humidity of atmosphere 18. As indicated in the Examples, higher moisture concentrations tend to have the effect of destabilizing glass foam bubbles 17 by increasing their size until they burst, and produce higher foam decay rates.

FIGS. 3, 4, 5, 6, 7 and 8 are schematic transverse cross-sectional views of six alternative embodiments of the system of FIGS. 1 and 2. Embodiment 200 illustrated schematically in FIG. 3 includes three apertures 22a, 22b, and 22c in roof 4, each accommodating respective air-fuel burners 32a, 32b, and 32c. Apertures 22d and 22e accommodate respective oxy-fuel burners 30a, 30b in sidewall structure 8. Embodiment 200 also allows adjustment of moisture concentration of atmosphere 18, as well as possibly other gases, such as oxides of carbon and sulfur, depending on the fuels used. Since oxy-fuel burners combusting natural gas produce combustion products having relatively continuous moisture content of about 58 mole percent, the moisture content of atmosphere 18 may be reduced slightly using the air-fuel burners in conjunction with the oxy-fuel burners. Shutting off the oxy-fuel burners while maintaining operation or increasing the output of the air-fuel burners would produce a lower amount of moisture is atmosphere 18, while shutting off the air-fuel burners and increasing the output of the oxy-fuel burners would have the opposite effect. This is one of many embodiments where the heating or maintaining temperature of the molten mass comprises combusting an oxidant with a fuel to produce combustion products. The combustion products mix with atmosphere 18. The oxidant may be selected from the group consisting of ambient air, synthetic air, oxygen-enriched ambient air, oxygen-enriched synthetic air, and compositions comprising more than about 95 mole percent oxygen.

Figure 4:
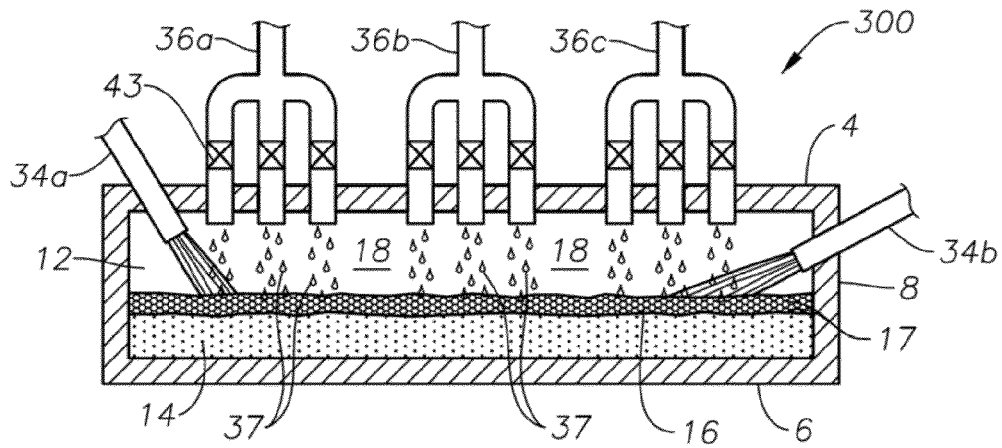

Turning now to FIG. 4, embodiment 300 illustrated schematically in FIG. 4 includes two or more water vapor or steam lances, 34a, 34b, as well as sources 36a, 36b, and 36c of liquid, such as liquid water, that is dripped onto glass foam 16. Valves 43 in one or more, or each conduit leading from sources 36a, 36b, and 36c allow control of the amount and drop size of drops of liquid 37, which fall through atmosphere 18 and impact glass foam 16. In the Examples herein, embodiment 300 produced the highest foam decay rate when liquid water was used. The flow rate of water vapor or steam may first be adjusted to provide the highest concentration of moisture in atmosphere 18 that may be obtained using those sources, after which the water or other liquid drip may be initiated. Alternatively, the dripping liquid may be started first, with the water vapor or steam lancing beginning thereafter. The flow rates or each depend upon the size of the downstream apparatus and size (volume) of atmosphere 18, as well as the exhaust system provided for the downstream apparatus. It should be noted that in embodiments where a composition is dropped onto, bubbled through, or otherwise added to the molten glass, the amount of composition added may range from a few grams up to a few kilograms per minute. The intention is to use a small amount so that the final glass chemistry is not affected, but that effectively de-stabilizes or stabilizes the foam as the case may be. The alternative is to formulate the glass so that the additional chemical completes the target chemistry. In the case of hydrated ingredients, both hydrated and non-hydrated forms may be used.

Figure 5:
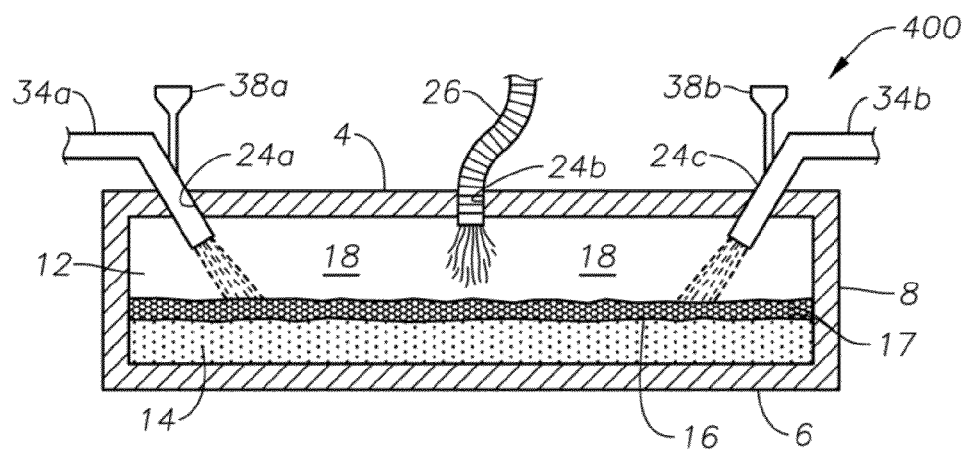

FIG. 5 illustrates schematically another system and method embodiment 400, comprising three apertures 24a, 24b, and 24c, with apertures 24a and 24c accommodating water vapor conduits and/or steam lances 34a and 34b. Water vapor supply conduits or steam lances 34a, 34b are equipped in embodiment 400 with respective sources 38a, 38b of liquid or solid chemical that are mixed with the water vapor and/or steam. Aperture 24b is fluidly connected with a source 26 of dry ambient air and/or dry synthetic air 26. Suitable liquid and/or solid chemicals are described herein.

Figure 6:
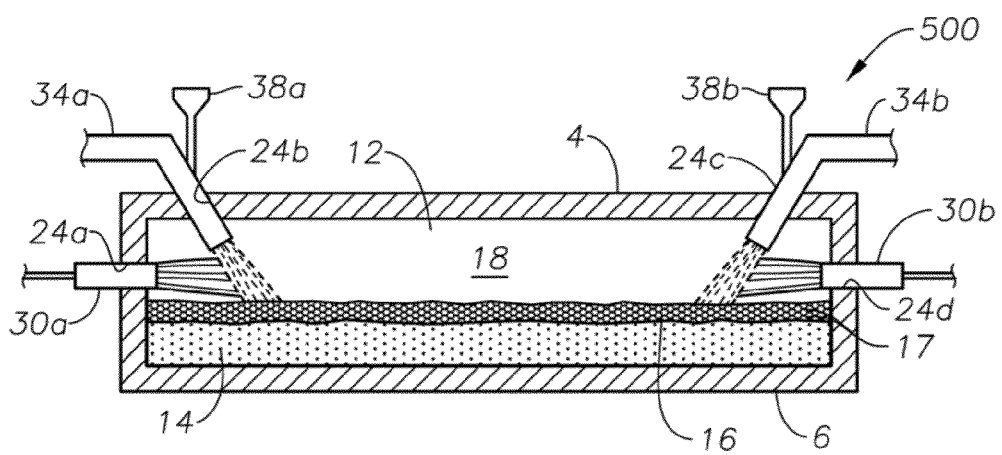

FIG. 6 illustrates schematically another system and method embodiment 500, which is similar to embodiment 400, but comprises four apertures 24a, 24b, 24c, and 24d, with apertures 24a and 24d accommodating oxy-fuel combustion burners 30a and 30b, and water vapor supply conduits or steam lances 34a, 34b are equipped with respective sources 38a, 38b of liquid or solid chemical that are mixed with the water vapor and/or steam. Because of the use of oxy-fuel combustion burners in embodiment 500, atmosphere 18 would have a higher concentration of moisture than embodiment 400 that employs dry ambient or dry synthetic air.

In embodiments such as embodiments 400 and 500, the chemical may be added to the water vapor spray as a slurry, emulsion, or dissolved in the water, or the chemical may be added to a flow of steam. The chemical may comprise one or more compounds selected from the group consisting of alkali metal chalcogens, alkali metal carbonates, and alkaline earth carbonates. Alums are not preferred for glass chemistry reasons. The addition of a trivalent metal would not serve well in the quick incorporation into the glass structure and could have a large chemical reducing effect on the glass.

Figure 7:
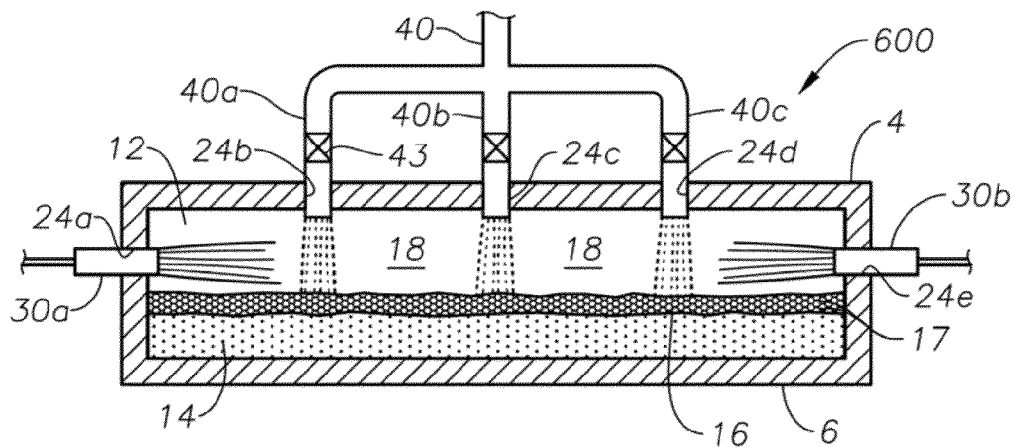

Turning now to FIG. 7, embodiment 600 illustrated schematically in FIG. 7 includes at least five apertures 24a, 24b, 24c, 24d, and 24e, with apertures 24a and 24e accommodating oxy-fuel combustion burners 30a, 30b, and apertures 24b-d accommodating sources of a gas or vapor comprising oxides of sulfur, such as sulfur dioxide, through respective minor conduits 40a, 40b, and 40c, with a primary or main conduit 40 supplying the minor conduits. A plurality of valves 43 may be use to control the amount and location of addition of the gas to atmosphere 18. During laboratory testing, embodiments using gases such as used in embodiment 600 showed a tendency to stabilize size of glass foam bubbles 17. Embodiment 600 is an example of controlling the composition of atmosphere 18 above glass foam 16 by injecting a non-combustion composition into at least a portion of the atmosphere from a source outside of the downstream apparatus using one or more apparatus positioned in one or more apertures the sidewall structure and/or the roof. In certain embodiments the non-combustion composition comprises 10 mole percent of an oxygenated sulfur compound or less, and in certain other embodiments the non-combustion composition comprises 1 mole percent of an oxygenated sulfur compound or less.

Figure 8:
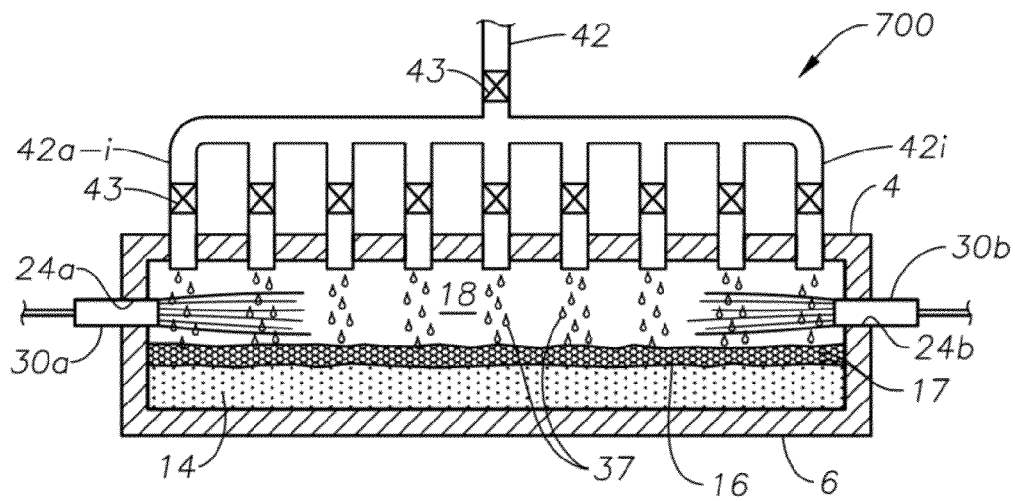

FIG. 8 illustrates schematically another system and method embodiment 700, comprising a plurality of apertures in roof 4 accommodating a corresponding plurality of minor conduits 42a-i, and which are configured to direct drops of a liquid or solid composition through atmosphere 18 and thereafter onto glass foam 16. A main or primary header conduit 42 supplies minor conduits 42a-i. Apertures 24a and 24b accommodate oxy-fuel burners 30a, 30b. This embodiment may afford a quite high concentration of moisture in atmosphere 18, but perhaps not as high as embodiment 300, illustrated schematically in FIG. 4. Suitable solids may include alkali metal chalcogens. Suitable alkali metal chalcogens may be selected from the group consisting of alkali metal sulfates, alkali metal bisulfates, alkali metal sulfites, alkali metal persulfates, alkaline earth sulfates, mixtures of two or more of these, and salts of two or more of these. Alkaline carbonates and alkaline earth carbonates or their mixtures may also be employed, which may release one or more carbon oxides and may therefore produce a secondary "popping" or sudden expansion effect, further de-stabilizing or destroying bubbles. Alkali metal chalcogens may exhibit this behavior as well, releasing one or more sulfur oxides. Specific alkali metal chalcogens may include those selected from the group consisting of sodium sulfate, sodium bisulfate, sodium sulfite, sodium persulfate, lithium sulfate, potassium sulfate, rubidium sulfate, caesium sulfate, double salts of two of these, and double salts of one of these with another compound. In other embodiments, the solid particles may be include glass particles, such as glass cullet. In certain embodiments, the solids may comprise a mixture of alkali metal chalcogen particles and glass particles, and the methods may comprise dropping the mixture onto at least a portion of the top surface of the glass foam from a source outside of and fluidly connected to the downstream apparatus. In other embodiments, the glass particles may be dropped onto the glass foam first to form a modified glass foam, followed by dropping alkali metal chalcogen particles onto the modified glass foam.

Figure 9:
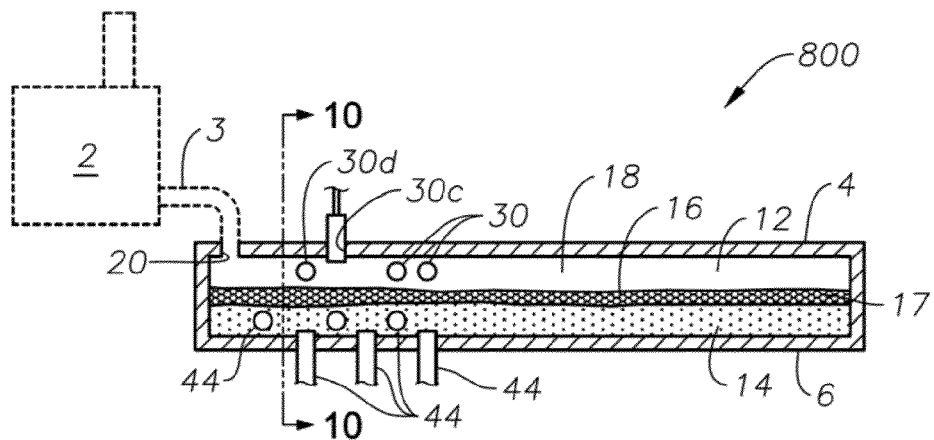
FIG. 9 is a schematic side elevation view, partially in cross-section, of another system embodiment in accordance with the present disclosure.

FIG. 9 is a schematic side elevation view, partially in cross-section, of another system embodiment 800 in accordance with the present disclosure, and FIG. 10 is a schematic transverse cross-section of embodiment 800. Embodiment 800 includes oxy-fuel combustion burners 30 producing combustion gases that mix with atmosphere 18, as well as supply conduits 44 for addition of non-combustion gases, such as oxides of sulfur (in certain embodiments combined with another gas such as oxygen), under the level of the molten glass 14. As illustrated schematically in FIGS. 9 and 10, oxy-fuel combustion burners 30 may be positioned in various locations in the downstream apparatus, for example, burners 30a and 30d may be positioned upstream of burners 30b and 30c. Similarly, gas supply conduits 44 may be variously positioned at the same or different downstream locations as other gas supply conduits, as well at the same or different downstream positions as the combustion burners. The goal of embodiments such as embodiment 800 is to bubble oxides of sulfur, such as sulfur dioxide, optionally mixed with oxygen, through the molten glass 14 and stabilize bubble layer 16. This practice is advantageous when the desire is to produce foamed glass products. As noted in the view of FIG. 9, foam layer 16 does not significantly change in foam height (foam thickness) as the molten mass of glass moves from left to right in the downstream apparatus, or is held stationary. Embodiment 800 is one example of a method and system for controlling bubble size of glass foam bubbles 17 by bubbling a composition comprising an oxygenated sulfur compound and optionally oxygen below a level of the foamed glass in the downstream apparatus, thereby stabilizing size of the glass foam bubbles 17 and a foam decay rate. In certain embodiments, if oxygen is present in the composition, the molar ratio of oxygenated sulfur compound to oxygen ranges from about 3:1 to about 0.5:1.

FIGS. 11, 12, 13, 14, and 15 are logic diagrams of five method embodiments of the present disclosure. Method embodiment 900 of FIG. 11 includes the steps of flowing a molten mass of foamed glass comprising molten glass and bubbles entrained therein into an apparatus downstream of a submerged combustion melter, the downstream apparatus comprising a floor, a roof, and a sidewall structure connecting the floor and roof, the foamed glass having glass foam comprising glass foam bubbles on at least a portion of a top surface of the foamed glass, the downstream apparatus defining a space for a gaseous atmosphere above and in contact with the glass foam, box 902. This method further comprises heating or maintaining temperature of the foamed glass in the downstream apparatus, box 904, and controlling bubble size of the glass foam bubbles in the foamed glass by controlling composition of the atmosphere above the glass foam in the downstream apparatus, box 906.

Figure 12:
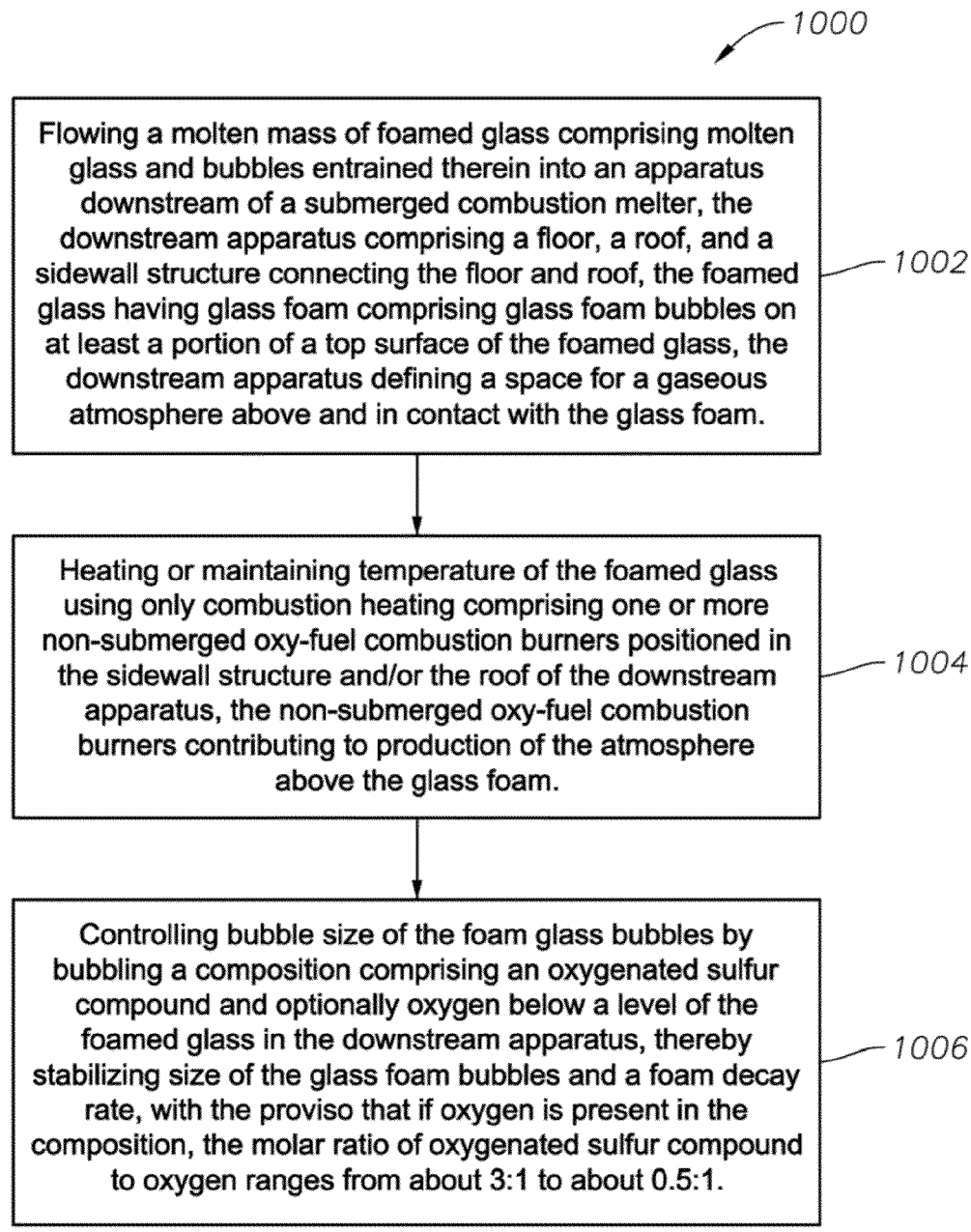

Method embodiment 1000 of FIG. 12 comprises flowing a molten mass of foamed glass comprising molten glass and bubbles entrained therein into an apparatus downstream of a submerged combustion melter, the downstream apparatus comprising a floor, a roof, and a sidewall structure connecting the floor and the roof, the foamed glass having glass foam comprising glass foam bubbles on at least a portion of a top surface of the foamed glass, the downstream apparatus defining a space for a gaseous atmosphere above and in contact with the glass foam, box 1002. This method further comprises heating or maintaining temperature of the foamed glass using only combustion heating comprising one or more non-submerged oxy-fuel combustion burners positioned in the sidewall structure and/or the roof of the downstream apparatus, the non-submerged oxy-fuel combustion burners contributing to production of the atmosphere above the glass foam, box 1004. Method embodiment 1000 further includes controlling bubble size of the glass foam bubbles by bubbling a composition comprising an oxygenated sulfur compound and optionally oxygen below a level of the foamed glass in the downstream apparatus, thereby stabilizing size of the glass foam bubbles and a foam decay rate, with the proviso that if oxygen is present in the composition, the molar ratio of oxygenated sulfur compound to oxygen ranges from about 3:1 to about 0.5:1, box 1006

Figure 13:
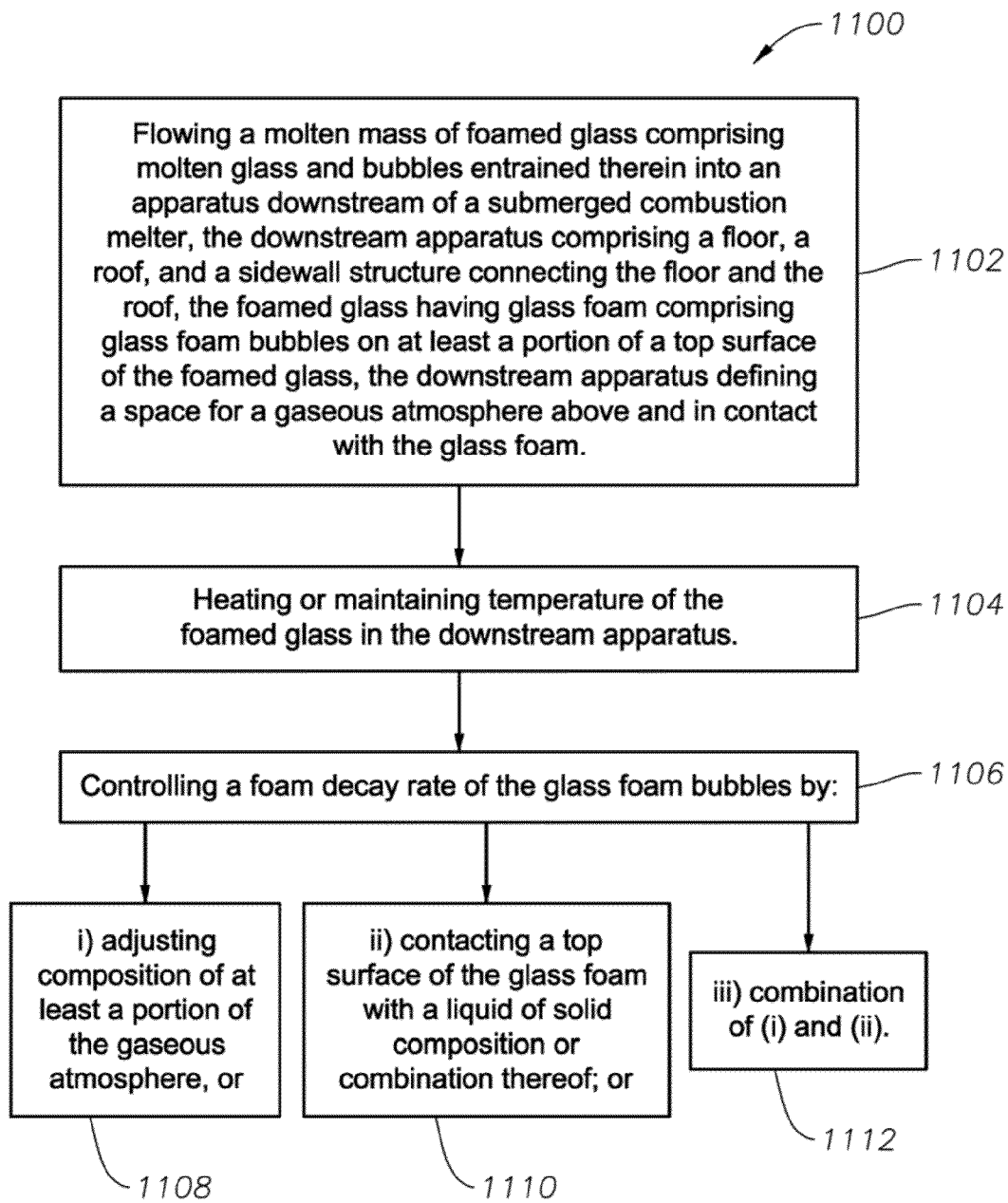

Method embodiment 1100 illustrated in FIG. 13 comprises flowing a molten mass of foamed glass comprising molten glass and bubbles entrained therein into an apparatus downstream of a submerged combustion melter, the downstream apparatus comprising a floor, a roof, and a sidewall structure connecting the floor and the roof, the foamed glass having glass foam comprising glass foam bubbles on at least a portion of a top surface of the foamed glass, the downstream apparatus defining a space for a gaseous atmosphere above and in contact with the glass foam, box 1102. Method embodiment 1100 further includes heating or maintaining temperature of the foamed glass in the downstream apparatus, box 1104. Method embodiment 1100 further includes controlling a foam decay rate of the glass foam bubbles, box 1106 by: i) adjusting composition of at least a portion of the gaseous atmosphere, box 1108; or ii) contacting a top surface of the glass foam with a liquid or solid composition or combination thereof, box 1110; or iii) combination of (i) and (ii), as depicted in box 1112.

Figure 14:
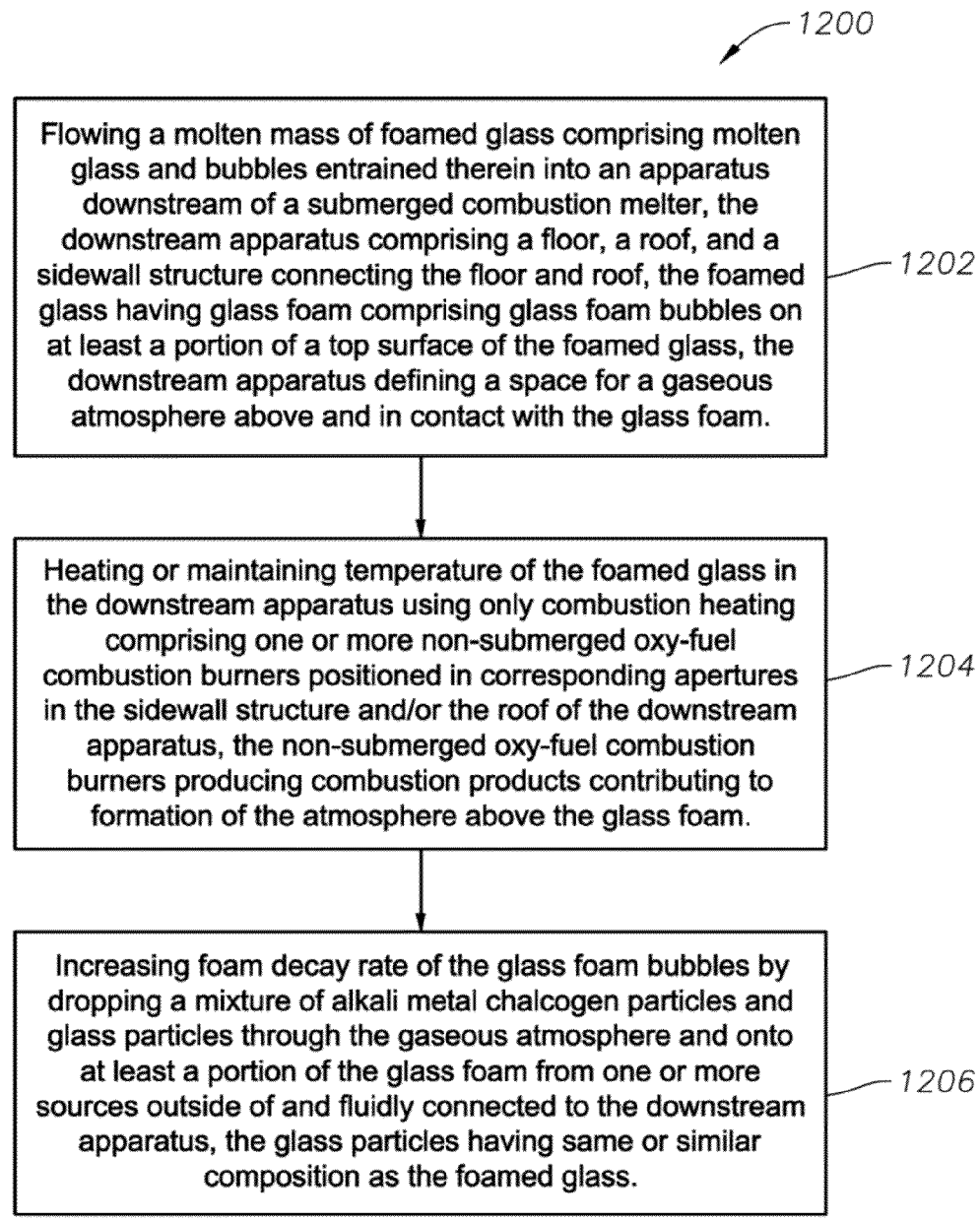

Method embodiment 1200 illustrated in FIG. 14 comprises flowing a molten mass of foamed glass comprising molten glass and bubbles entrained therein into an apparatus downstream of a submerged combustion melter, the downstream apparatus comprising a floor, a roof, and a sidewall structure connecting the floor and roof, the foamed glass having glass foam comprising glass foam bubbles on at least a portion of a top surface of the foamed glass, the downstream apparatus defining a space for a gaseous atmosphere above and in contact with the glass foam, box 1202. The method further comprises heating or maintaining temperature of the foamed glass in the downstream apparatus using only combustion heating comprising one or more non-submerged oxy-fuel combustion burners positioned in corresponding apertures in the sidewall structure and/or the roof of the downstream apparatus, the non-submerged oxy-fuel combustion burners producing combustion products contributing to formation of the atmosphere above the glass foam, box 1204. Method 1200 further includes increasing the foam decay rate of the glass foam bubbles by dropping a mixture of alkali metal chalcogen particles and glass particles through the gaseous atmosphere and onto at least a portion of the glass foam from one or more sources outside of and fluidly connected to the downstream apparatus, the glass particles having same or similar composition as the foamed glass, box 1206.

Figure 15:
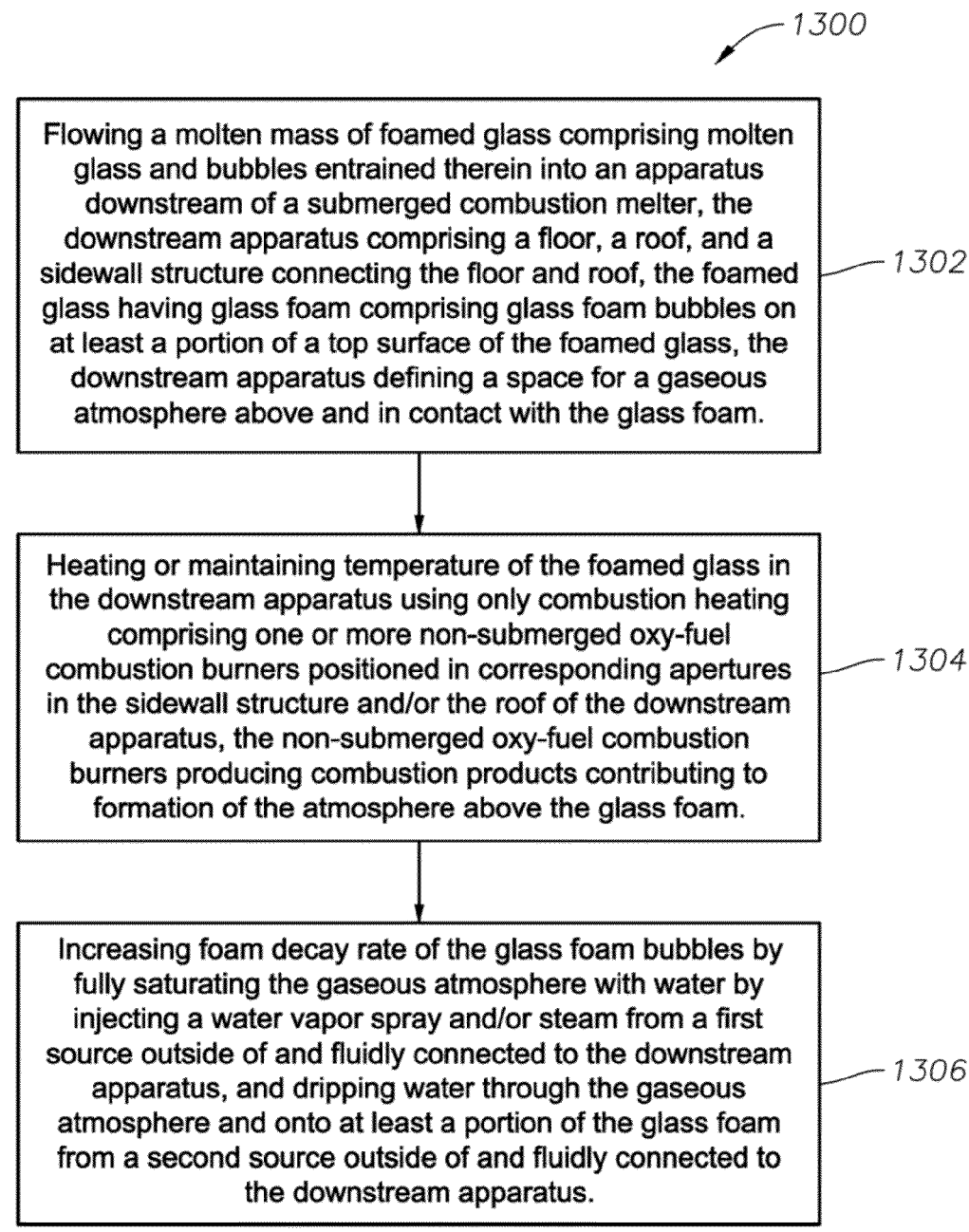

Method embodiment 1300 illustrated in FIG. 15 comprises flowing a molten mass of foamed glass comprising molten glass and bubbles entrained therein into an apparatus downstream of a submerged combustion melter, the downstream apparatus comprising a floor, a roof, and a sidewall structure connecting the floor and roof, the foamed glass having glass foam comprising glass foam bubbles on at least a portion of a top surface of the foamed glass, the downstream apparatus defining a space for a gaseous atmosphere above and in contact with the glass foam, box 1302. The method includes heating or maintaining temperature of the foamed glass in the downstream apparatus using only combustion heating comprising one or more non-submerged oxy-fuel combustion burners positioned in corresponding apertures in the sidewall structure and/or the roof of the downstream apparatus, the non-submerged oxy-fuel combustion burners producing combustion products contributing to formation of the atmosphere above the glass foam, box 1304. Method embodiment 1300 further includes increasing the foam decay rate of the glass foam bubbles by fully saturating the gaseous atmosphere with water by injecting a water vapor spray and/or steam from a first source outside of and fluidly connected to the downstream apparatus, and dripping water through the gaseous atmosphere and onto at least a portion of the glass foam from a second source outside of and fluidly connected to the downstream apparatus, box 1306.

SC burners in an SCM produce a turbulent melt comprising bubbles having a bubble atmosphere. In general the atmosphere of the bubbles is about the same from bubble to bubble, but that is not necessarily so. One or more burners in SCM 2 may be oxy-fuel burners. SCM 2 may receive numerous feeds through one or more inlet ports, and batch feeders maybe provided. Other feeds are possible, such as glass mat waste, wound roving, waste materials, and the like, such as disclosed in assignee's U.S. Pat. No. 8,650,914.

Many of the system and method embodiments of the present disclosure may include valves and appropriate valve controls (not illustrated) to pulse or oscillate flow of fuel and/or oxidant to burners. The pulsing may be random or non-random, and may provide certain benefits, such as reduced NOx emissions. The principle and the various methods of implementation are broadly described in U.S. Pat. Nos. 4,846,665, 5,302,111, and 5,522,721 and U.S. Publication No. 2006/0177785. The main idea is to puke the flow of fuel, or oxidant being supplied to at least one burner of the furnace, to generate successive fuel-rich and fuel-lean zones in a flame. In certain embodiments, the flow rate of a main or primary oxidant is controlled by a main oxidant flow rate control unit, and oscillating combustion is generated by oscillating the fuel flow with an oscillating valve and combusting the oscillating fuel with the main oxidant adjacent the burner to produce combustion products.

In embodiments employing water vapor injectors and/or steam lances, and embodiments where gaseous, liquid, or solid compositions, or mixtures thereof, are injected (not dropped) into atmosphere 18, one or more nozzles may extend through respective apertures in the downstream apparatus, and be supplied by respective supply conduits. Suitable nozzles for use in systems of the present disclosure include single-fluid nozzles and multiple-fluid nozzles, and representative examples are schematically illustrated in assignee's co-pending application Ser. No. 13/644,058, filed Oct. 3, 2012. Suitable single-fluid nozzles may include, but are not limited to, plain orifice type nozzles, which includes a nozzle body defining a cavity, and having an exit end comprising an orifice. Suitable single-fluid nozzles may also include shaped orifice nozzles comprising a nozzle body and cavity, and further comprising a shaped body portion defining a central passage leading fluid or slurry to a hemispherical inlet that expands into a V-notch exit, which then routes fluid or slurry through a cylindrical region, and finally out exit end. The hemispherical shaped inlet and a "V" notched outlet to cause the flow to spread out on the axis of the V notch and produce a relatively flat fan spray.

Other suitable single-fluid nozzles may include surface impingement fluid nozzles comprising two or more simple orifices which route fluid or slurry to impinge on a conical impact surface or other shaped impact surface and form a conical spray. A surface impingement nozzle causes a stream of liquid to impinge on a surface resulting in a sheet of liquid that breaks up into drops. Yet other suitable single-fluid nozzles may include pressure-swirl spray nozzles comprising a central conduit more or less concentric with a nozzle body and forming there between a nozzle annulus. A nozzle insert includes one or more-small diameter passages that route fluid or slurry into a central chamber defined by a nozzle head. One or more swirl plates provide a swirling action to the fluid or slurry passing through this nozzle as the fluid or slurry passes through an exit orifice. The spray formed may be a more focused spray than that formed from other nozzles. Pressure-swirl spray nozzles are high-performance (small drop size) devices. The stationary core induces a rotary fluid motion that causes the swirling of the fluid in the swirl chamber. A film is discharged from the perimeter of the outlet orifice producing a characteristic hollow cone spray pattern. Air or other surrounding gas is drawn inside the swirl chamber to form an air core within the swirling liquid. Many configurations of fluid inlets are used to produce this hollow cone pattern depending on the nozzle capacity and materials of construction. A spill-return pressure-swirl single-fluid nozzle is one variety of pressure swirl nozzle includes a controlled return of fluid from the swirl chamber to the feed system. This allows the nozzle pressure drop to remain high while allowing a wide range of operating rates. Solid cone nozzles produce a "solid" cone spray of fluid or slurry by employing a vane-shaped internal region. A swirling liquid motion is induced with the vane structure, however; the discharge flow fills the entire outlet orifice. For the same capacity and pressure drop, a full cone nozzle will produce a larger drop size than a hollow cone nozzle. The coverage is the desired feature for such a nozzle, which is often used for applications to distribute fluid over an area. Compound nozzles, which include two or more types of nozzles, may also be suitable. Compound nozzles allow control of drop size and spray coverage angle.

Suitable multiple-fluid nozzles include both internal-mix multiple fluid nozzles and external-mix multiple-fluid nozzles. One example of an internal-mix multiple fluid nozzle comprises a nozzle body, a central conduit, forming there between a nozzle annulus through which flows a first fluid or slurry. A second fluid or slurry flows though a central passage of the central conduit. The central conduit includes a tapered section, followed by a cylindrical end section that forms an exit for the central passage. The nozzle body also has a tapered section, which forces the first fluid or slurry to change course and mix with the second fluid or slurry in an internal mixing region. Suitable external-mix multiple-fluid nozzles have similar structure to internal-mix multiple-fluid nozzles, except that central conduit is moved so that its exit orifice is generally co-planar with the exit end of nozzle body, forming an external mixing zone where the first and second fluids or slurries may mix.

As used herein the term "nozzle" includes atomizers, and suitable atomizers that may be used in systems and methods of the present disclosure include, but are not limited to, rotary atomizers, electrostatic atomizers, and ultrasonic atomizers. One example of a rotary atomizer is described in U.S. Pat. No. 6,578,779. Rotary atomizers use a high speed rotating disk, cup or wheel to discharge liquid at high speed to the perimeter, forming a hollow cone spray. The rotational speed controls the drop size. Electrostatic charging of sprays may be useful for high transfer efficiency. The charging is typically at high voltage (20 to 40 kV) but low current. An example of such a device is illustrated is U.S. Pat. No. 5,011,086.

Ultrasonic atomizer spray nozzles utilize high frequency (20 kHz to 50 kHz) vibration to produce narrow drop-size distribution and low velocity spray from a liquid. The vibration of a piezoelectric crystal causes capillary waves on the nozzle surface liquid film. An example of such a device illustrated schematically in U.S. Pat. No. 4,723,708.

Fluids or slurries may be supplied from one or more supply tanks or containers which are fluidly and mechanically connected to the downstream apparatus via one or more conduits, which may or may not include flow control valves. One or more of the conduits may be flexible metal hoses, but they may also be solid metal, ceramic, or ceramic-lined metal conduits. Any or all of the conduits may include a flow control valve, which may be adjusted to shut off flow through a particular conduit.

In order to determine which of the many foam embodiments may work best for any given situation to stabilize or de-stabilize bubbles in the glass foam may take a small amount of experimentation, but the degree of experimentation is not considered to be extensive or undue. Basically, the molten mass of glass and foam is allowed to enter the downstream apparatus, and one or more of the glass foam stabilization or de-stabilization techniques begun soon thereafter, and tuned to achieve the greatest stabilization or de-stabilization effect on the foam.

In systems and methods employing dropping of particulate solids onto the glass foam, such as embodiment 700 of FIG. 8, one or more hoppers (not illustrated) containing one or more particles or particulate matter may be provided. One or more hoppers may route particles through roof 4, through sidewall 8, or through both, through various apertures. Hoppers may be positioned in multiple longitudinal and transverse positions in downstream apparatus. While it is contemplated that that particulate will flow merely by gravity from the hoppers, and the hoppers need not have a pressure above the solids level, certain embodiments may include a pressurized headspace above the solids in the hoppers. In embodiments, the teachings of assignee's co-pending application U.S. Ser. No. 13/540,704, filed Jul. 3, 2012, describing various screw-feeder embodiments, and teaching of feed material compaction may be useful, although in the present methods and systems loss of batch or other feed material is not the primary concern. In fact, in terms of foam de-stabilization, uncompacted batch or other particulate matter may be preferred. One or more of the hoppers may include shakers or other apparatus common in industry to dislodge overly compacted solids and keep the particles flowing. Furthermore, each hopper will have a valve other apparatus to stop or adjust flow of particulate matter into the downstream apparatus. These details are not illustrated for sake of brevity.

Certain systems and methods of the present disclosure may be combined with other strategies for foam de-stabilization, if that is the desired end. For example, adding nitrogen as a treating composition to the molten mass of glass and bubbles in the downstream apparatus may tend to make bubbles in glass foam 16 less stable when there is the presence of a high moisture atmosphere in the downstream apparatus. A high moisture atmosphere may exist in the downstream apparatus for example when one or more high momentum burners (whether oxy/fuel or not) are used as impingement burners in the downstream apparatus to impinge on glass foam 16. The use of one or more high momentum impingement burners (whether oxy/fuel or not) in a downstream flow channel is described in assignee's U.S. Pat. No. 8,707,739.

Measuring effectiveness of the foam stabilization or de-stabilization systems and methods described herein may generally be made by taking samples of the molten mass of glass and counting bubbles and their size in the molten mass, or a solidified or partially solidified sample thereof, using the naked eye. Another naked eye measurement may simply be comparing an acceptable glass to a glass sample made using a system and method of the present disclosure, and making a naked eye comparison. More sophisticated methods and equipment may certainly be used, such as image analysis using computers to measure size, size distribution and quantity of bubbles (or other parameters) within a high-resolution photograph or micrograph of the material to be analyzed. For example, companies such as Glass Service market methods and equipment for such measurements. The glass melting method, as well as phenomena within the melt, may be continuously observed, recorded and evaluated using a high temperature observation furnace equipped with a special silica observation crucible. This equipment may be further coupled with image analysis equipment to provide easy manipulation of recorded data. For example, in a "melt test", the objective is to evaluate the fining characteristics of differing batch compositions. The area of the recorded images occupied by inhomogeneities (bubbles), bubble size distribution, bubble number, as well as bubble growth rates vs. melting time, may be evaluated to provide comparison between individual batches. The records of the melting course may be provided in the form of video files, which may be displayed on a personal computer, handheld computer, or other viewer. Bubble growth rate, or shrinkage rate, or rate of disappearance measurements may be based on direct observation and recording of bubble sizes depending on time. It is possible to keep bubbles suspended in the melt for hours by the developed "shuttle" method.

In embodiments of the present disclosure, a reduction of 5 percent, or 10 percent, or 20 percent, or 30 percent or more of foam may be acceptable. In other embodiments, nothing short of complete or substantially complete foam or bubble removal will suffice, in other words 90 percent, or 95 percent, or 99 percent, or even 99.9 percent reduction in foam and bubbles.

The downstream apparatus may include one or more bushings (not illustrated) for example when producing glass fiber (not illustrated). Downstream apparatus for use in systems and methods of the present disclosure may comprise a roof, floor and sidewall structure comprised of an outer metal shell, non-glass-contact brick or other refractory wall, and glass-contact refractory for those portions expected to be in contact with molten glass. Downstream apparatus may include several sections arranged in series, each section having a roof, floor, and sidewall structure connecting its roof and floor, and defining a flow channel for conditioning molten glass flowing there through. The sections may be divided by a series of skimmers, each extending generally substantially vertically downward a portion of a distance between the roof and floor of the channel, with a final skimmer positioned between a last channel section and a forehearth. The number of sections and the number of skimmers may each be more or less than two. The downstream apparatus may be rectangular as illustrated in the various figures, or may be a shape such as a generally U-shaped or V-shaped channel or trough of refractory material supported by a metallic superstructure.

The flow rate of the molten glass through the downstream apparatus (unless it is a holding container without flow) will depend on many factors, including the geometry and size of the SCM and downstream apparatus, temperature of the melt, viscosity of the melt, and like parameters, but in general the flow rate of molten glass may range from about 0.5 lb./min to about 5000 lbs./min or more (about 0.23 kg/min to about 2300 kg/min or more), or from about 10 lbs./min to about 500 lbs./min (from about 4.5 kg/min to about 227 kg/min), or from about 100 lbs./min to 300 lbs./min (from about 45 kg/min to about 136 kg/min).

Certain embodiment may use low momentum burners. Low momentum burners useful in systems and methods of this disclosure may include some of the features of those thereof. A glass composition for producing glass fibers known as "E-glass" typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass compositions may be used, such as those described in assignee's published U.S. applications 20070220922 and 20080276652. The initial raw material to provide these glass compositions can be calculated in known manner from the desired concentrations of glass components, molar masses of glass components, chemical formulas of batch components, and the molar masses of the batch components. Typical E-glass batches include those reproduced in Table 1, borrowed from the 20070220922 application. Notice that during glass melting, carbon dioxide (from lime) and water (borax) evaporate. The initial raw material can be provided in any form such as, for example, relatively small particles.

TABLE 1

Typical E-glass batches

| Raw material | A Limestone (Baseline) | B Quick-lime | C Ca Silicate | D Volcanic Glass | E Ca Silicate & Volcanic Glass | F Quartz-free #1 | G Quartz-free #2 | H Limestone/Slag | I Ca-Silicate/Slag | J Quartz-free #3 | K Quartz and Clay Free | L Ca-Silicate/Feldspar |
|---|---|---|---|---|---|---|---|---|---|---|---|---|
| Quartz (flint) | 31.3% | 35.9% | 15.2% | 22.6% | 8.5% | 0% | 0% | 22.3% | 5.7% | 0% | 0% | 19.9% |
| Kaolin Clay | 28.1% | 32.3% | 32.0% | 23.0% | 28.2% | 26.4% | 0% | 22.7% | 26.0% | 26.0% | 0% | 0% |
| BD Lime | 3.4% | 4.3% | 3.9% | 3.3% | 3.8% | 3.7% | 4.3% | 2.8% | 3.1% | 3.1% | 4.3% | 4.4% |
| Borax | 4.7% | 5.2% | 5.2% | 0% | 1.5% | 0% | 0% | 0% | 0% | 0% | 1.1% | 1.1% |
| Boric Acid | 3.2% | 3.9% | 3.6% | 7.3% | 6.9% | 8.2% | 8.6% | 7.3% | 8.2% | 8.2% | 7.7% | 7.8% |
| Salt Cake | 0.2% | 0.2% | 0.2% | 0.2% | 0.2% | 0.2% | 0.2% | 0.2% | 0.2% | 0.2% | 0.2% | 0.2% |
| Limestone | 29.1% | 0% | 0% | 28.7% | 0% | 0% | 0% | 27.9% | 0% | 0% | 0% | 0% |
| Quicklime | 0% | 18.3% | 0% | 0% | 0% | 0% | 0% | 0% | 0% | 0% | 0% | 0% |
| Calcium Silicate | 0% | 0% | 39.9% | 0% | 39.1% | 39.0% | 27.6% | 0% | 37.9% | 37.9% | 26.5% | 26.6% |
| Volcanic Glass | 0% | 0% | 0% | 14.9% | 11.8% | 17.0% | 4.2% | 14.7% | 16.8% | 16.8% | 0% | 0% |
| Diatomaceous Earth (DE) | | | | | | 5.5% | 17.4% | 0% | 0% | 5.7% | 20.0% | 0% |
| Plagioclase Feldspar | | | | | | 0% | 38.3% | 0% | 0% | 0% | 40.1% | 40.1% |
| Slag | | | | | | 0% | 0% | 2.0% | 2.0% | 2.0% | 0% | 0% |
| Total | 100% | 100% | 100% | 100% | 100% | 100% | 100% | 100% | 100% | 100% | 100% | 100% |
| Volume of $CO_2$ @ 1400 C. | 1668 | 0 | 0 | 1647 | 0 | 0 | 0 | 1624 | 0 | 0 | 0 | 0 | disclosed in assignee's U.S. patent application Ser. No. 13/268,130, filed Oct. 7, 2011. For low momentum burners using natural gas as fuel, the burners may have a fuel firing rate ranging from about 0.4 to about 40 scfh (from about 11 L/hr. to about 1,120 L/hr.); an oxygen firing rate ranging from about 0.6 to about 100 scfh (from about 17 L/hr. to about 2,840 L/hr.); a combustion ratio ranging from about 1.5 to about 2.5; nozzle velocity ratio (ratio of velocity of fuel to oxygen at the fuel nozzle tip) ranging from about 0.5 to about 2.5; a fuel velocity ranging from about 6 ft./second to about 40 ft./second (about 2 meters/second to about 12 meters/second) and an oxidant velocity ranging from about 6 ft./second to about 40 ft./second (about 2 meters/second to about 12 meters/second).

Those of skill in this art will readily understand the need for, and be able to construct suitable fuel supply conduits and oxidant supply conduits, as well as respective flow control valves, threaded fittings, quick connect/disconnect fittings, hose fittings, and the like.

Submerged combustion melters may be fed a variety of feed materials. The initial raw material may include any material suitable for forming molten glass such as, for example, limestone, glass, sand, soda ash, feldspar and mixtures SCMs may also be fed by one or more roll stands, which in turn supports one or more rolls of glass mat, as described in assignee's U.S. Pat. No. 8,650,914, incorporated herein by reference. In certain embodiments powered nip rolls may include cutting knives or other cutting components to cut or chop the mat (or roving, in those embodiments processing roving) into smaller length pieces prior to entering the SCM. Also provided in certain embodiments may be a glass batch feeder. Glass batch feeders are well-known in this art and require no further explanation.

Downstream apparatus may include refractory fluid-cooled panels. Liquid-cooled panels may be used, having one or more conduits or tubing therein, supplied with liquid through one conduit, with another conduit discharging warmed liquid, routing heat transferred from inside the melter to the liquid away from the melter. Liquid-cooled panels may also include a thin refractory liner, which minimizes heat losses from the melter, but allows formation of a thin frozen glass shell to form on the surfaces and prevent any refractory wear and associated glass contamination. Other useful cooled panels include air-cooled panels, comprising a conduit that has a first, small diameter section, and a large diameter section. Warmed air transverses the conduits such that the conduit having the larger diameter accommodates expansion of the air as it is warmed. Air-cooled panels are described more fully in U.S. Pat. No. 6,244,197. In certain embodiments, the refractory fluid cooled-panels are cooled by a heat transfer fluid selected from the group consisting of gaseous, liquid, or combinations of gaseous and liquid compositions that functions or is capable of being modified to function as a heat transfer fluid. Gaseous heat transfer fluids may be selected from air, including ambient air and treated air (for air treated to remove moisture), inert inorganic gases, such as nitrogen, argon, and helium, inert organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids may be selected from inert liquids that may be organic, inorganic, or some combination thereof; for example, salt solutions, glycol solutions, oils and the like. Other possible heat transfer fluids include steam (if cooler than the oxygen manifold temperature), carbon dioxide, or mixtures thereof with nitrogen. Heat transfer fluids may be compositions comprising both gas and liquid phases, such as the higher chlorofluorocarbons.

Certain embodiments may comprise a method control scheme for the downstream apparatus. For example, as explained in the '970 application, a master method controller may be configured to provide any number of control logics, including feedback control, feed-forward control, cascade control, and the like. The disclosure is not limited to a single master method controller, as any combination of controllers could be used. The term "control", used as a transitive verb, means to verify or regulate by comparing with a standard or desired value. Control may be closed loop, feedback, feed-forward, cascade, model predictive, adaptive, heuristic and combinations thereof. The term "controller" means a device at least capable of accepting input from sensors and meters in real time or near-real time, and sending commands directly to one or more foam de-stabilization elements, and/or to local devices associated with foam de-stabilization elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules. The controller may utilize Model Predictive Control (MPC) or other advanced multivariable control methods used in multiple input/multiple output (MIMO) systems. As mentioned previously, the methods of assignee's co-pending application U.S. Ser. No. 13/268,065, filed Oct. 7, 2011, using the vibrations and oscillations of the melter itself, may prove useful predictive control inputs.

The downstream apparatus floors and sidewall structures may include a glass-contact refractory lining. The glass-contact lining may be 1 centimeter, 2 centimeters, 3 centimeters or more in thickness, however, greater thickness may entail more expense without resultant greater benefit. The refractory lining may be one or multiple layers. Glass-contact refractory used in downstream apparatus described herein may be cast concretes such as disclosed in U.S. Pat. No. 4,323,718. Two cast concrete layers are described in the '718 patent, the first being a hydraulically setting insulating composition (for example, that known under the trade designation CASTABLE BLOC-MIX-G, a product of Fleischmann Company, Frankfurt/Main, Federal Republic of Germany). This composition may be poured in a form of a wall section of desired thickness, for example a layer 5 cm thick, or 10 cm, or greater. This material is allowed to set, followed by a second layer of a hydraulically setting refractory casting composition (such as that known under the trade designation RAPID BLOCK RG 158, a product of Fleischmann company, Frankfurt/Main, Federal Republic of Germany) may be applied thereonto. Other suitable materials for the downstream apparatus, components that require resistance to high temperatures, such as particle guns, rotating blades and paddles, and refractory block burners (if used) are fused zirconia ($ZrO_2$), fused cast AZS (alumina-zirconia-silica), rebonded AZS, or fused cast alumina ($Al_2O_3$). The choice of a particular material is dictated among other parameters by the geometry of the downstream apparatus and the foam de-stabilization equipment used, and the type of glass to be produced.

EXAMPLES

Laboratory testing was carried out to evaluate use of atmospheres of different compositions to influence the foam decay rate and the size of the bubbles within the glass foam layer of glass compositions produced from an SCM. Nine trial conditions were tested, the details of which are detailed herein. Videos were made of all trials and bubble size measurements were made of the noted trials.

The experiments were conducted by placing 20 grams of SCM melter discharge (E-glass) into a quartz tube and placing the tube into a pre-heated furnace at 1375° C. The atmosphere inside of the tube, considered to be a reasonable simulation of the conditions inside the atmosphere of an apparatus downstream of an SCM, was controlled by adding gases of specific mixture from a gas mixing and flow control station to the top of the tube. The tube was sealed with a high temperature refractory fiber so that the ambient air was sealed outside the tube and only the gases from the mixing and flow control station were allowed into the tube. The gases were discharged from the quartz tube through a small ceramic tube inserted through the fiber seal. Solid chemicals were added to (dropped onto) the foam surface through the gas discharge tube for the experiments for adding a solid to the foam surface.

The nine experimental cases are shown in Table 2.

TABLE 2

Experiments

| Experiment Number (Example Number) | Experiment Name | Experimental Conditions |
|---|---|---|
| 1 (Comparative Example 1) | Base Case | Oxy-fuel combustion atmosphere (40% $CO_2$, 2% $O_2$, 58% $H_2O$) |
| 2 (Example 1) | Dry Air | Dry air - 19% $O_2$, 81% $N_2$ |
| 3 (Example 2) | Wet Air | Wet air - ambient air saturated with water up to 70% |
| 4 (Example 3) | Base Case with $SO_2$ | Base case atmosphere with 1 mole % $SO_2$ added |
| 5 (Example 4) | Base Case with $SO_2$/$O_2$ | Base case atmosphere with a mixture of $SO_2$ and $O_2$, molar ration of 2:1 SO2 to $O_2$, 50 ml/min bubbled below the glass for 10 minutes. |
| 6 (Example 5) | Base Case with sodium sulfate and cullet mixture | Base case with 0.1 gram of $Na_2SO_4$ diluted with 0.5 gram of processed E-glass cullet added to the top of |

TABLE 2-continued

Experiments

| Experiment Number (Example Number) | Experiment Name | Experimental Conditions |
|---|---|---|
| 7 (Comparative Example 2) | Repeat Base Case | the foam at the 45 min. mark of the test Same as 1 |
| 8 (Example 6) | Base case with cullet followed by sodium sulfate | Base case atmosphere, plus adding 0.6 gram of processed basement cullet added to the top of the foam after 45 minutes of test time, followed about 10 minutes later by adding 0.1 gram of $Na_2SO_4$ to the top of the foam |
| 9 (Example 7) | Base case/fully saturated | Base case atmosphere fully saturated with water |

Experiment 1, called the Base Case, simulated the expected atmosphere above the SCM glass in a refractory channel downstream of the SCM, where the channel is heated with oxy-fuel firing with natural gas, providing an atmosphere of $CO_2$, $O_2$, and water vapor in the concentrations indicated in Table 2. Videos were made of each experimental trial case and measurements completed for the amount of clear glass at the bottom of the glass and the height of foam on top of the glass. Changes in these measurements over the duration of each test give the rate of fining and foam decay rate. Bubbling $SO_2$ gas through the glass or adding $SO_2$ to the atmosphere above the glass had little effect on the foam decay, and therefore was deemed to stabilize the foam. FIGS. 16A-F, 17A-C, and 18A-E illustrate graphically some experimental results in accordance with these experiments.

Figure 16A:
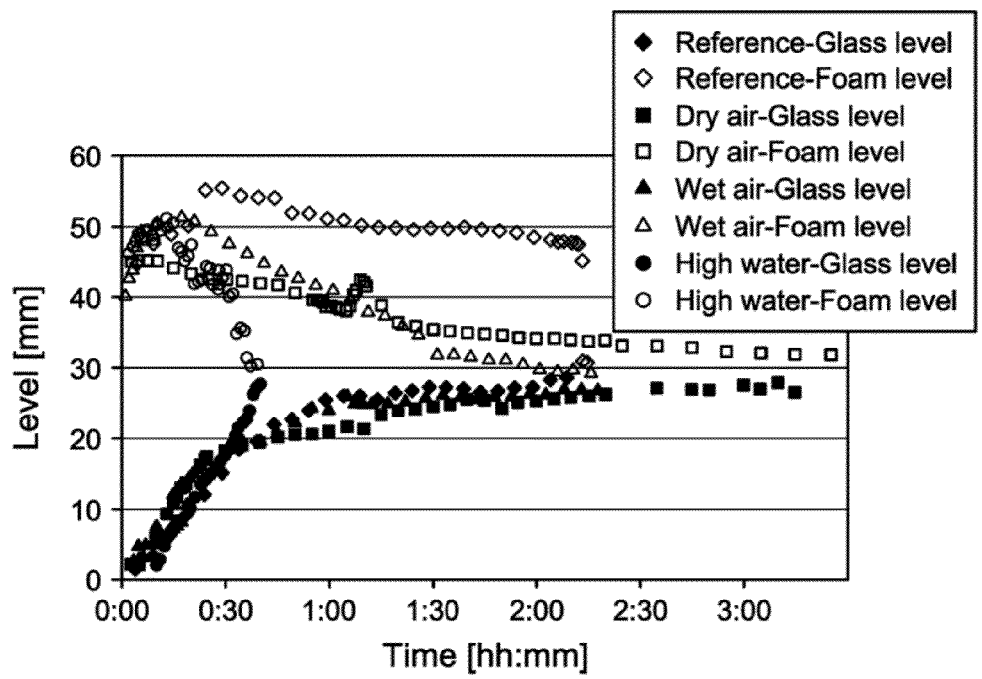
FIGS. 16A-F, 17A-C, and 18A-E illustrate graphically some experimental results in accordance with the present disclosure.
Figure 16B:
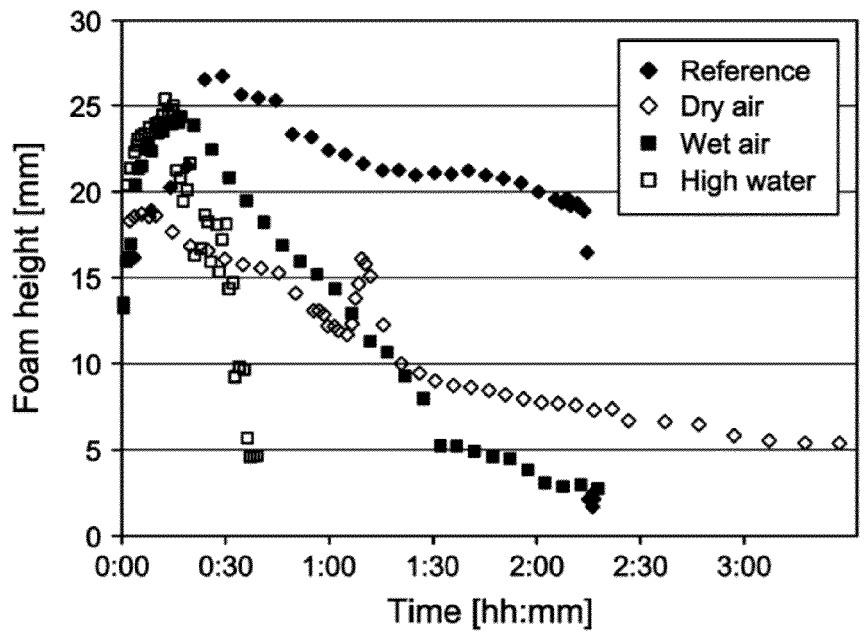

FIGS. 16A and 16B illustrate graphically the influence of water vapor on foam level and glass level, and summarize the results of Experiments 1, 2, 3, and 9 (Comparative Example 1, Example 1, Example 2, and Example 7). FIG. 16A illustrates foam level and glass level as a function of time for the four conditions represented in these examples, while FIG. 16B illustrates foam height as a function of time for these four experiments.

Figure 16C:
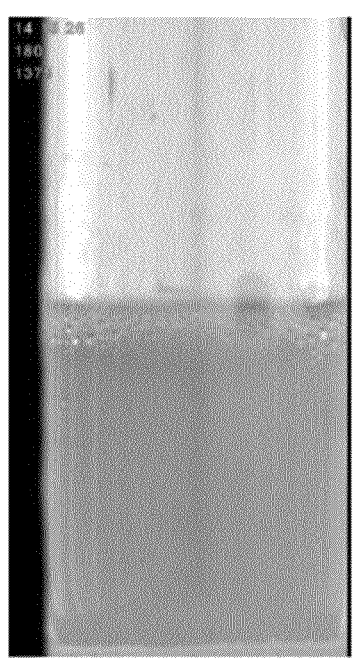

Example 1 (Dry Air), referencing FIG. 16C: compared with the Base Case the following observations were made: 1) there was no formation of huge bubbles, and 2) foam decay rate was very gradual, there was a very long "tail", in that even after three hours there was still some foam present.

Figure 16D:
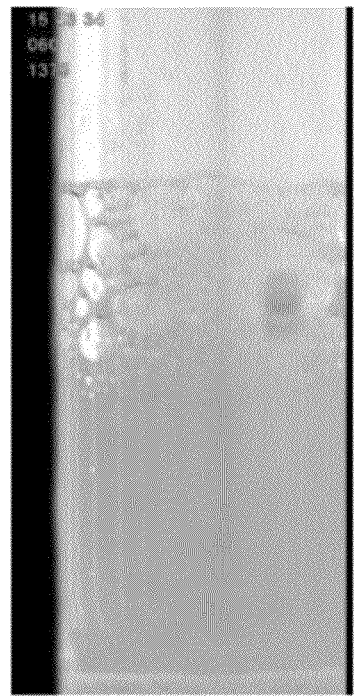

Example 2 (Wet Air), referencing FIG. 16D: compared with the Base Case the following observations were made: 1) similar to the Base Case, large bubbles were formed; 2) the foam level and foam height decreased more rapidly, indicating that water in the atmosphere had a significant impact to increase the foam decay rate, and the diffusion of water into the bubbles, resulting in larger bubbles; and 3) "foam free" glass was obtained after about two hours. In light of these test results, the mechanism of bubble de-stabilization and breakage appeared to be that the partial pressure of water ($ppH_2O$), being higher on the outside of the bubbles than inside the bubbles, caused the water to diffuse into the bubbles making them grow larger and resulting in thinner glass bubble layers that were easier to break. The evidence for this was the measurement of larger bubbles in the tests where the $ppH_2O$ was higher. The effectiveness of this was better than expected from discussions with others and from the literature.

Figure 16E:
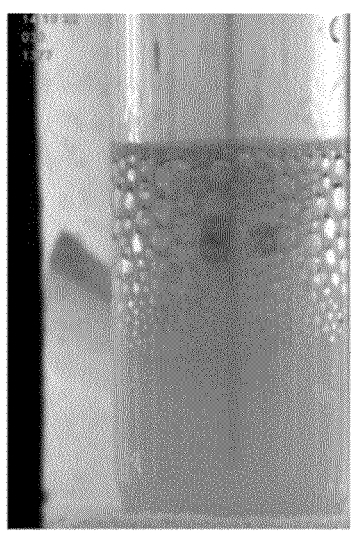
Figure 16F:
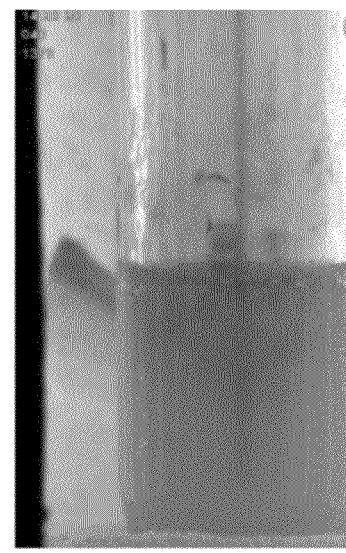

Example 7 (Base Case/fully saturated), referencing FIGS. 16E and 16F: compared with the Base Case the following observations were made: 1) foam level and foam height decreased very rapidly (compare FIG. 16E, after 30 minutes, with FIG. 16F, after 40 minutes); 2) foam decay rate was also much faster compared to the Example 2 (Wet Air), which was surmised to be a combined effect of a) faster bubbles growth, and b) water droplets falling on the foam surface; and 3) "foam free" glass was obtained after only 40 minutes. The effectiveness of water drops impinging on the foam was much greater than expected. We expected that dropping water drops onto the foam would just have the effect of decreasing the bubble size due to cooling the gases inside the bubbles, with the bubbles simply returning to the original size once the water evaporated and the gases reheated. This did not happen.

Figure 17A:
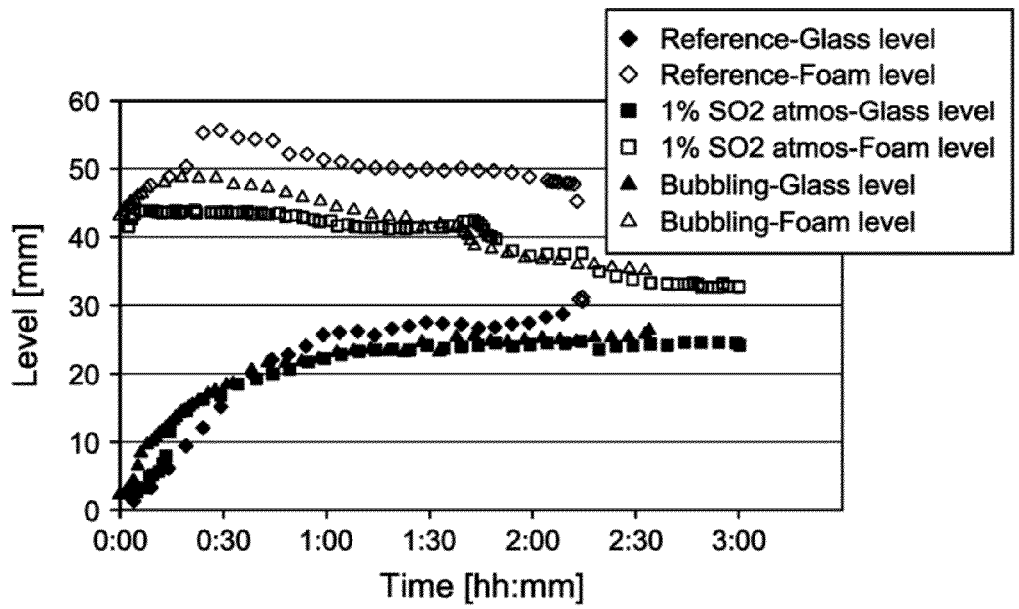
Figure 17B:
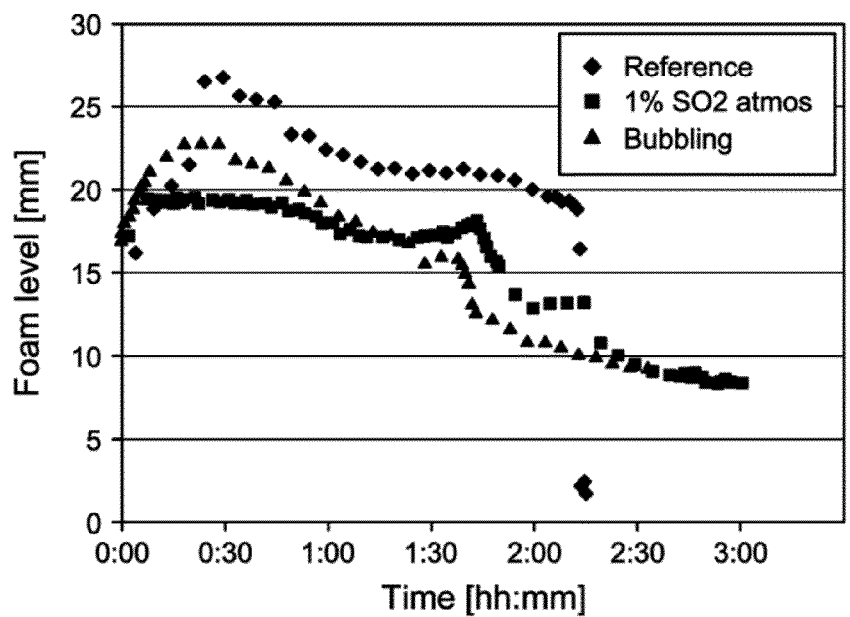

FIGS. 17A and 17B illustrate graphically the influence of sulfur dioxide and a mixture of sulfur dioxide and oxygen on foam level and glass level, and summarize the results of Experiments 4 and 5 (Examples 3 and 4). FIG. 17A illustrates foam level and glass level as a function of time for the Base Case and the two conditions represented in Examples 3 and 4, while FIG. 17B illustrates foam height as a function of time for the Base Case and Examples 3 and 4.

Figure 17C:
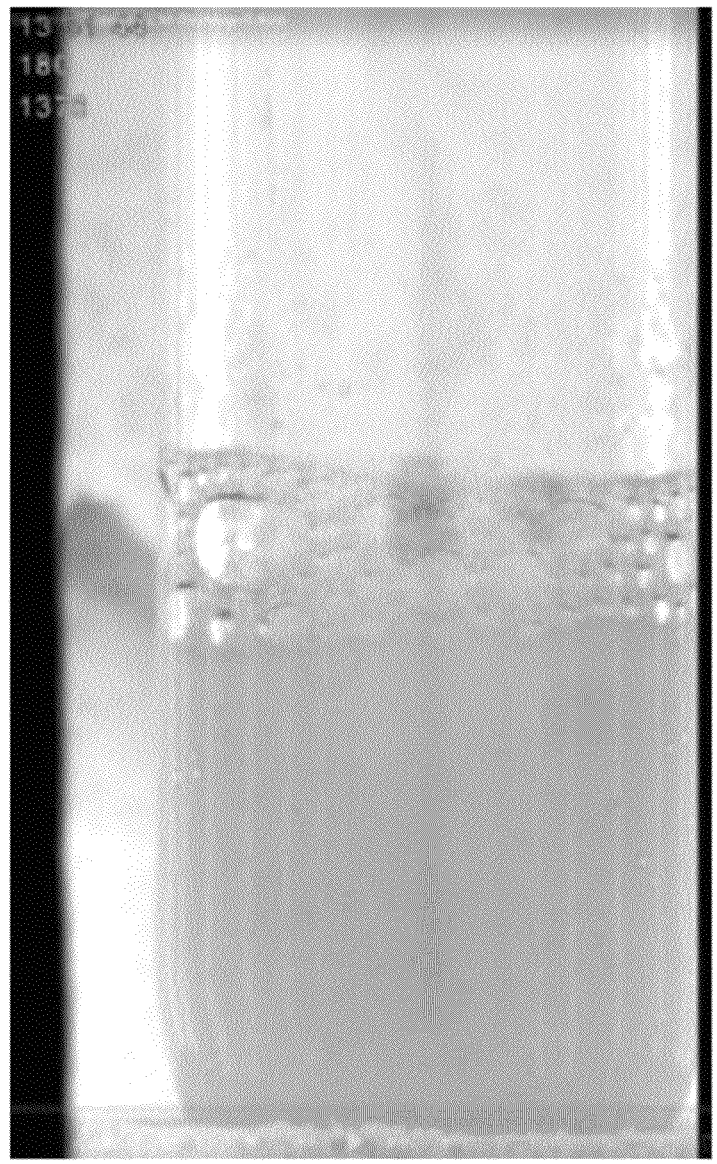

Examples 3 and 4, Influence of Sulfur Dioxide Gas, referencing FIG. 17C: as may be seen, addition of $SO_2$ in the atmosphere (1 molar percent $SO_2$) or by bubbling (in combination with oxygen) did not result in a faster foam decay rate of the foam height. Even after three hours there was still some foam (FIG. 17C). Thus, these compositions in the atmosphere of an apparatus downstream of an SCM would tend to stabilize the foam layer, and lead to production of foamed glass products.

Figure 18A:
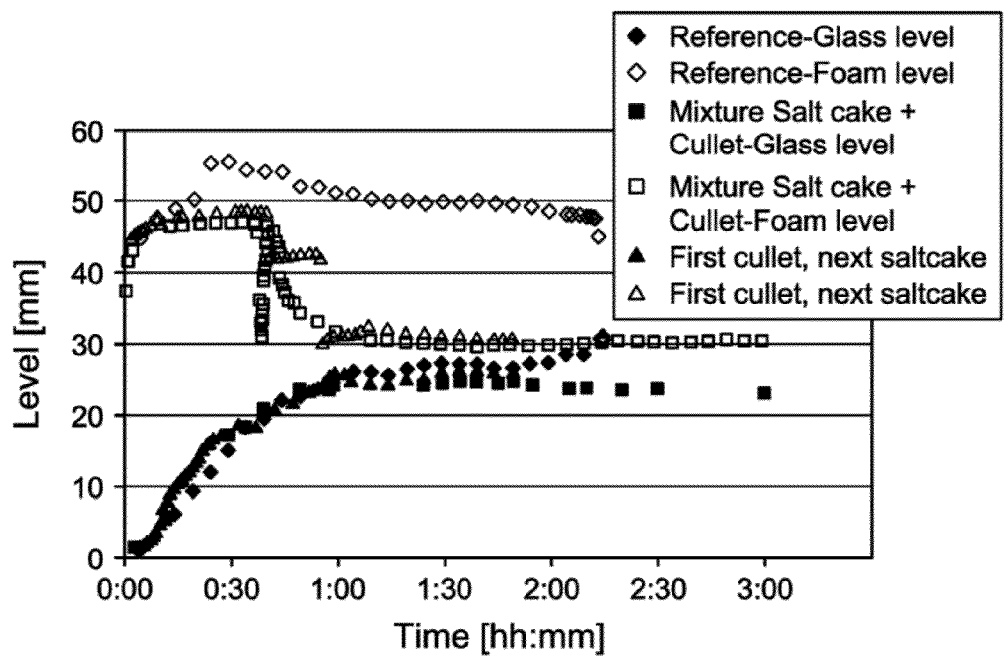
Figure 18B:
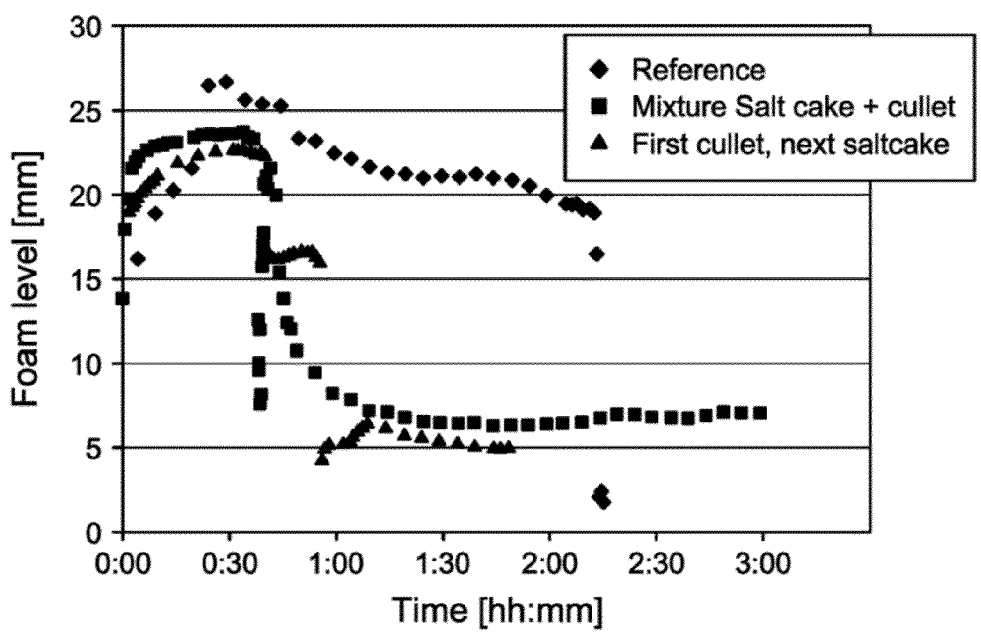

FIGS. 18A and 18B illustrate graphically the influence of dropping a mixture of sodium sulfate and cullet on foam level and glass level (Example 5), and the influence of first dropping cullet, then sodium sulfate onto the foam (Example 6) on foam level and glass level, and summarize the results of Experiments 6 and 8 (Examples 5 and 6). FIG. 18A illustrates foam level and glass level as a function of time for the Base Case and the two conditions represented in Examples 5 and 6, while FIG. 18B illustrates foam height as a function of time for the Base Case and Examples 5 and 6.

Figure 18C:
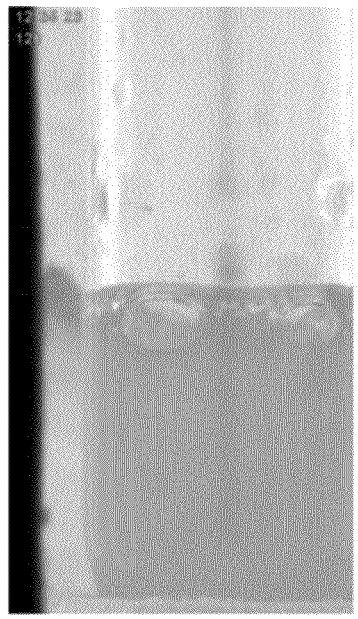

Examples 5 and 6, Influence of Sodium Sulfate and Cullet, referencing FIGS. 18C, 18D, and 18E: as may be seen, addition of a mixture of sodium sulfate and cullet on the foam surface resulted in a temporary smaller foam height, and subsequently gases were produced resulting in more foam production; in the final stage (tail) of the experiment some larger bubbles were created and observed (FIG. 18C), these bubbles disturbed the foam level measurement (resulting in a stable foam level of about 7 mm). Omitting the larger bubbles, a foam free melt was obtained within about 1 one hour (after introducing the sodium sulfate/cullet mixture on top of the melt).

Figure 18D:
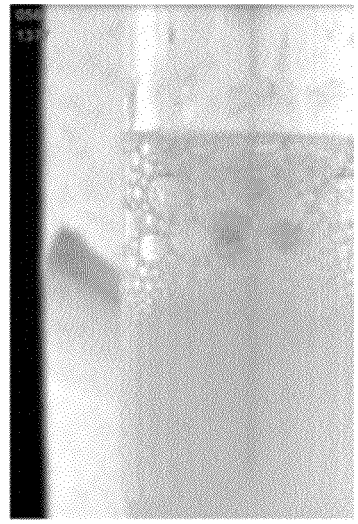
Figure 18E:
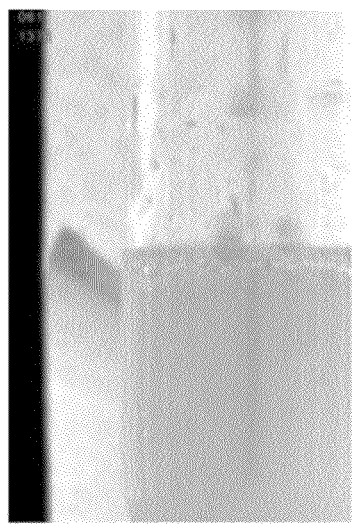

In Example 6, where cullet was first applied to the foam, then sodium sulfate, the following observations were made: 1) the addition of cullet resulted in disturbance of the foam, and the foam level decreased; 2) with addition of pure sodium sulfate the foam disappeared almost instantaneously (within 2-3 minutes, perhaps after melting of the sodium sulfate, compare FIG. 18D, taken 2 minutes prior to addition of sodium sulfate to the foam, with FIG. 18E, taken 3 minutes after addition of sodium sulfate to the foam); and 3) due to the addition of sodium sulfate, some growth of bubbles was observed in the top layer of the melt, resulting in limited foam height growth.

Those having ordinary skill in this art will appreciate that there are many possible variations of the systems and methods described herein, and will be able to devise alternatives and improvements to those described herein that are nevertheless considered to be within the claims.

What is claimed is:

1. A method comprising:
flowing a molten mass of foamed glass comprising molten glass and bubbles entrained therein into an apparatus downstream of a submerged combustion melter, the downstream apparatus comprising a floor, a roof, and a sidewall structure connecting the floor and roof, the foamed glass having glass foam comprising glass foam bubbles on at least a portion of a top surface of the foamed glass, the downstream apparatus defining a space for a gaseous atmosphere above and in contact with the glass foam;
heating or maintaining temperature of the foamed glass in the downstream apparatus; and
controlling bubble size of the glass foam bubbles in the foamed glass by controlling composition of the atmosphere above the glass foam in the downstream apparatus;
wherein the heating or maintaining temperature of the foamed glass in the downstream apparatus is devoid of electrical heating, and comprises using one or more non-submerged oxy-fuel combustion burners positioned in corresponding apertures in the sidewall structure and/or the roof of the downstream apparatus, the non-submerged oxy-fuel combustion burners producing combustion products contributing to control of the atmosphere above the glass foam;
wherein the controlling of the composition of the atmosphere above the glass foam comprises injecting a non-combustion composition into at least a portion of the atmosphere from a source outside of the downstream apparatus using one or more apparatus positioned in one or more apertures in the sidewall structure and/or the roof; and
wherein the non-combustion composition comprises 10 mole percent of an oxygenated sulfur compound or less.

2. The method of claim 1 wherein the non-combustion composition comprises 1 mole percent of the oxygenated sulfur compound or less.

3. A method comprising:
flowing a molten mass of foamed glass comprising molten glass and bubbles entrained therein into an apparatus downstream of a submerged combustion melter, the downstream apparatus comprising a floor, a roof, and a sidewall structure connecting the floor and the roof, the foamed glass having glass foam comprising glass foam bubbles on at least a portion of a top surface of the foamed glass, the downstream apparatus defining a space for a gaseous atmosphere above and in contact with the glass foam;
heating or maintaining temperature of the foamed glass in the downstream apparatus, wherein the heating or maintaining temperature of the foamed glass in the downstream apparatus is devoid of electrical heating, and comprises using one or more non-submerged oxy-fuel combustion burners positioned in corresponding apertures in the sidewall structure and/or the roof of the downstream apparatus, the non-submerged oxy-fuel combustion burners producing combustion products contributing to control of the atmosphere above the glass foam; and
controlling a foam decay rate of the glass foam bubbles by injecting a non-combustion composition into at least a portion of the atmosphere from a source outside of the downstream apparatus using one or more apparatus positioned in one or more apertures the sidewall structure and/or the roof, wherein the non-combustion composition comprises 10 mole percent of an oxygenated sulfur compound or less.

4. The method of claim 3 wherein the non-combustion composition comprises 1 mole percent of the oxygenated sulfur compound or less.

* * * * *